United States Patent
Jiang et al.

(10) Patent No.: US 11,567,295 B2
(45) Date of Patent: Jan. 31, 2023

(54) OPTICAL IMAGING LENS ASSEMBLY

(71) Applicant: Zhejiang Sunny Optical Co., Ltd, Ningbo (CN)

(72) Inventors: Chaoqun Jiang, Ningbo (CN); Fujian Dai, Ningbo (CN); Liefeng Zhao, Ningbo (CN)

(73) Assignee: Zhejiang Sunny Optical Co., Ltd

(*) Notice: Subject to any disclaimer, the term of this patent is extended or adjusted under 35 U.S.C. 154(b) by 283 days.

(21) Appl. No.: 17/087,183

(22) Filed: Nov. 2, 2020

(65) Prior Publication Data

US 2021/0255425 A1 Aug. 19, 2021

(30) Foreign Application Priority Data

Feb. 18, 2020 (CN) .......................... 202010099550.9

(51) Int. Cl.
*G02B 9/64* (2006.01)
*G02B 27/00* (2006.01)
*G02B 3/04* (2006.01)

(52) U.S. Cl.
CPC ........... *G02B 9/64* (2013.01); *G02B 27/0025* (2013.01); *G02B 3/04* (2013.01)

(58) Field of Classification Search
CPC ........ G02B 3/04; G02B 9/64; G02B 13/0045; G02B 13/06; G02B 27/0025
See application file for complete search history.

(56) References Cited

U.S. PATENT DOCUMENTS

2021/0055515 A1* 2/2021 Dai .................. G02B 13/18

* cited by examiner

*Primary Examiner* — Jack Dinh
(74) *Attorney, Agent, or Firm* — Barnes & Thornburg LLP

(57) ABSTRACT

The present disclosure discloses an optical imaging lens assembly including, sequentially from an object side to an image side along an optical axis, a first lens, a second lens, a third lens, a fourth lens, a fifth lens, a sixth lens and a seventh lens. At least one of the first lens to the seventh lens is a glass lens. The third lens has positive refractive power, and an image-side surface of the third lens is a convex surface. An object-side surface of the seventh lens is a convex surface, and an image-side surface of the seventh lens is a concave surface. A maximum field-of-view FOV of the optical imaging lens assembly satisfies FOV≥134.56°. An effective half-aperture DT62 of an image-side surface of the sixth lens and an effective half-aperture DT72 of the image-side surface of the seventh lens satisfy 0.54≤DT62/DT72.

20 Claims, 11 Drawing Sheets

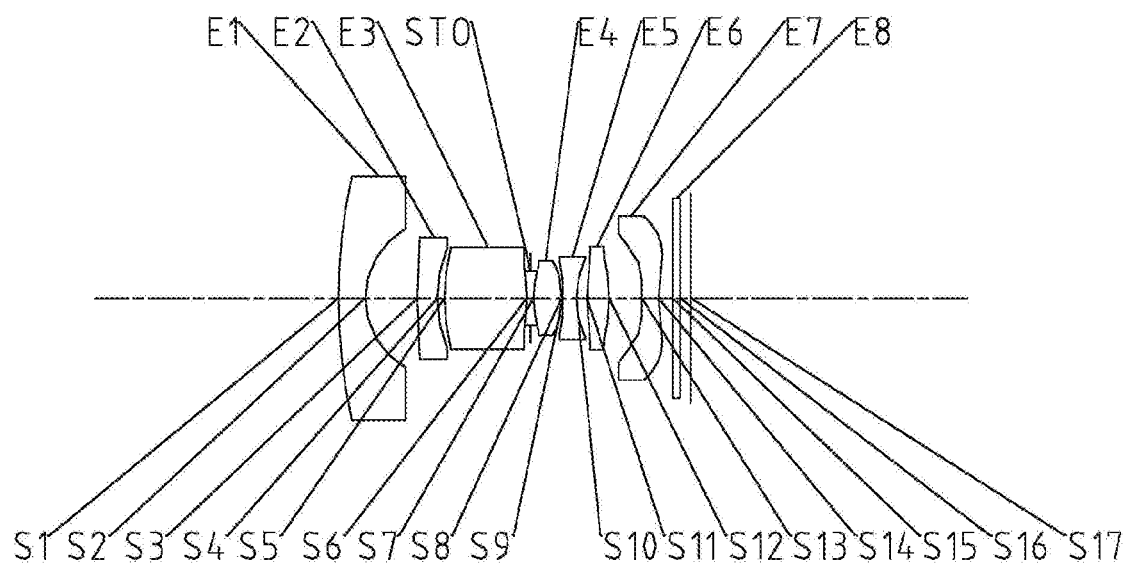
Fig. 1
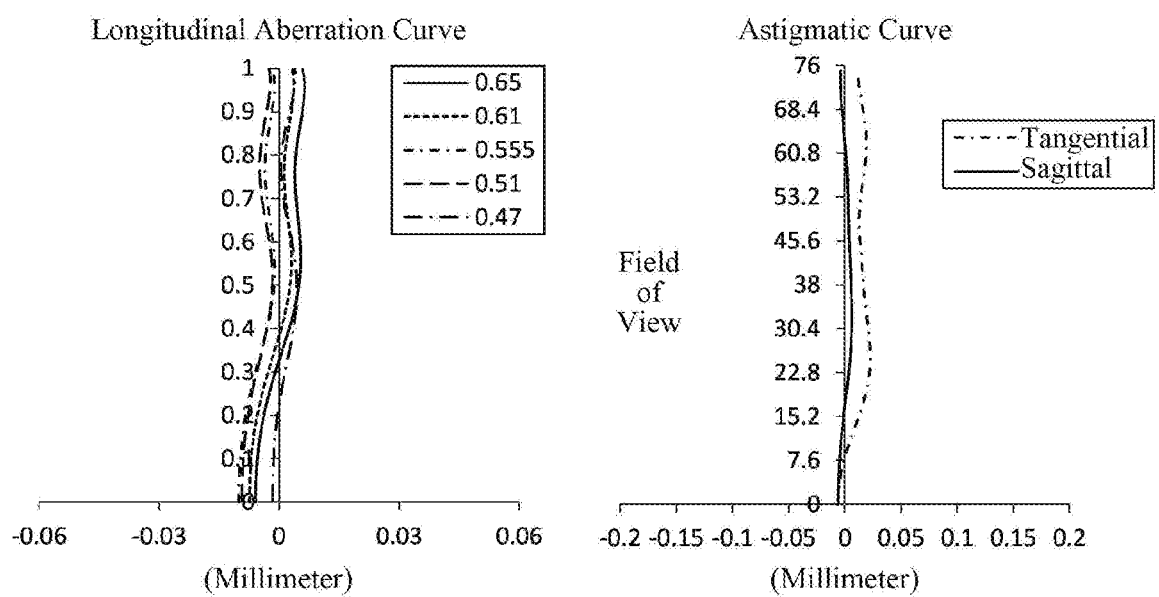
Fig. 2A                    Fig. 2B

OPTICAL IMAGING LENS ASSEMBLY

CROSS-REFERENCE TO RELATED APPLICATION

This application claims benefit of priority to Chinese Patent Application No. 202010099550.9 filed on Feb. 18, 2020 before the China National Intellectual Property Administration, the entire disclosure of which is incorporated herein by reference in its entity.

TECHNICAL FIELD

The present disclosure relates to the field of optical elements, and more specifically, relates to an optical imaging lens assembly.

BACKGROUND

In recent years, with the development of IoT technology and 5G technology, the intelligentization of electronic devices has been further developed. The intelligentization of electronic device usually requires upgrading various components thereon. For example, in order to obtain visual signals or optical signals, an optical imaging lens assembly is usually installed on an electronic device.

An electronic device, such as a surveillance camera, includes an optical imaging lens assembly to facilitate the achievement of the camera function. An electronic device is usually also provided with a Charge-coupled Device (CCD) type image sensor or a Complementary Metal Oxide Semiconductor (CMOS) type image sensor. The optical imaging lens assembly may collect the light on the object side, and the imaging light travels along the optical path of the optical imaging lens assembly and irradiates the image sensor. The image sensor converts the light signal into an electrical signal to form image data. These electronic devices are often disposed in an environment with unstable temperature and need to work continuously.

An optical imaging lens that may meet the imaging requirements of the optical imaging lens assembly while satisfying a large field-of-view, a large image plane and good temperature adaptability is needed.

SUMMARY

The present disclosure provides an optical imaging lens assembly that is applicable to portable electronic products and at least solves or partially solves at least one of the above disadvantages of the prior art.

In the first aspect, the present disclosure provides an optical imaging lens assembly which includes, sequentially from an object side to an image side along an optical axis, a first lens, a second lens, a third lens, a fourth lens, a fifth lens, a sixth lens, and a seventh lens. At least one of the first lens to the seventh lens is a glass lens. The third lens has positive refractive power, and an image-side surface thereof may be a convex surface. An object-side surface of the seventh lens may be a convex surface, and an image-side surface thereof may be a concave surface. A maximum field-of-view FOV of the optical imaging lens assembly may satisfy FOV≥134.56°. An effective half-aperture DT62 of an image-side surface of the sixth lens and an effective half-aperture DT72 of the image-side surface of the seventh lens may satisfy 0.54≤DT62/DT72. Half of a diagonal length ImgH of an effective pixel area on an imaging plane of the optical imaging lens assembly and an entrance pupil diameter EPD of the optical imaging lens assembly may satisfy ImgH*EPD>2 mm$^2$.

In one embodiment, at least one of an object-side surface of the first lens to the image-side surface of the seventh lens is aspheric.

In one embodiment, half of the diagonal length ImgH of the effective pixel area on the imaging plane of the optical imaging lens assembly and the maximum field-of-view FOV of the optical imaging lens assembly may satisfy ImgH/tan(FOV/4)<4.7 mm.

In one embodiment, a center thickness CT3 of the third lens along the optical axis and an edge thickness ET3 of the third lens may satisfy 0<ET3/CT3≤0.9.

In one embodiment, a total effective focal length f of the optical imaging lens assembly and an effective focal length f3 of the third lens may satisfy 0<f/f3<1.

In one embodiment, SAG71, being an on-axis distance from an intersection of the object-side surface of the seventh lens and the optical axis to a vertex of an effective radius of the object-side surface of the seventh lens, and SAG72, being an on-axis distance from an intersection of the image-side surface of the seventh lens and the optical axis to a vertex of an effective radius of the image-side surface of the seventh lens, may satisfy 0<SAG72/SAG71≤1.11.

In one embodiment, a center thickness CT3 of the third lens along the optical axis and a total effective focal length f of the optical imaging lens assembly may satisfy 0.4<CT3/f<1.4.

In one embodiment, a center thickness CT2 of the second lens along the optical axis, a center thickness CT3 of the third lens along the optical axis, a center thickness CT4 of the fourth lens along the optical axis and an on-axis distance TTL from an object-side surface of the first lens to the imaging plane may satisfy 0<(CT2+CT3+CT4)/TTL<0.6.

In one embodiment, a refractive index N1 of the first lens, a refractive index N3 of the third lens and a refractive index N4 of the fourth lens may satisfy 5≤N1+N3+N4<5.5.

In one embodiment, a radius of curvature R13 of the object-side surface of the seventh lens and a radius of curvature R14 of the image-side surface of the seventh lens may satisfy 0<R14/R13≤1.34.

In one embodiment, an Abbe number V1 of the first lens, an Abbe number V3 of the third lens and an Abbe number V4 of the fourth lens may satisfy 40<(V1+V3+V4)/3<55.

In one embodiment, a spaced interval T12 between the first lens and the second lens along the optical axis and a spaced interval T67 between the sixth lens and the seventh lens along the optical axis may satisfy 0<T67/T12<1.3.

In the second aspect, the present disclosure also provides an optical imaging lens assembly which includes, sequentially from an object side to an image side along an optical axis, a first lens, a second lens, a third lens, a fourth lens, a fifth lens, a sixth lens, and a seventh lens. At least one of the first lens to the seventh lens is a glass lens. The third lens has positive refractive power, and an image-side surface thereof may be a convex surface. An object-side surface of the seventh lens may be a convex surface, and an image-side surface thereof may be a concave surface. Half of a diagonal length ImgH of an effective pixel area on an imaging plane of the optical imaging lens assembly and a maximum field-of-view FOV of the optical imaging lens assembly may satisfy ImgH/tan(FOV/4)<4.7 mm. An effective half-aperture DT62 of an image-side surface of the sixth lens and an effective half-aperture DT72 of the image-side surface of the seventh lens may satisfy 0.54≤DT62/DT72. Half of the diagonal length ImgH of the effective pixel area on the imaging plane of the optical imaging lens assembly and an entrance pupil diameter EPD of the optical imaging lens assembly may satisfy ImgH*EPD>2 mm².

The present disclosure employs seven lenses, and the optical imaging lens assembly has at least one beneficial effect, such as a large image plane, a large viewing angle, good temperature adaptability, miniaturization, and low aberration and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 1 illustrates a schematic structural view of an optical imaging lens assembly according to example 1 of the present disclosure; and FIGS. 2A to 2D illustrate a longitudinal aberration curve, an astigmatic curve, a distortion curve, and a lateral color curve of the optical imaging lens assembly of the example 1, respectively.

DETAILED DESCRIPTION OF EMBODIMENTS

Figure 2C:
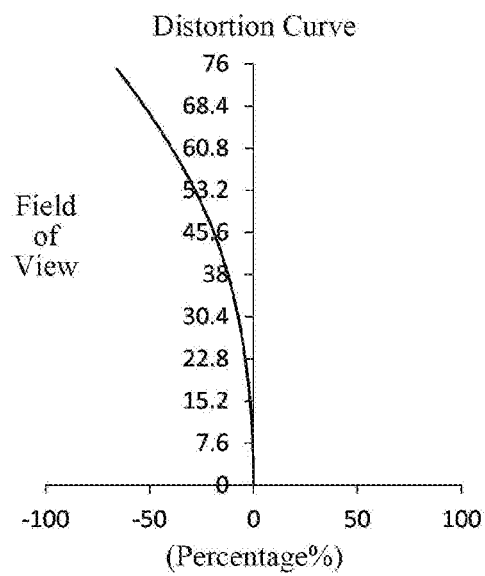

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, seven lenses having refractive power, that is, a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between each two adjacent lenses.

In an exemplary embodiment, at least one of the first lens to the seventh lens is a glass lens. By setting the lens as a glass lens, it is beneficial to improve the temperature adaptability of the optical imaging lens assembly. As another example, at least one of the first lens to the seventh lens is a plastic lens, and the lens group of the optical imaging lens assembly is a glass-plastic hybrid lens group, which has good adaptability to temperature.

In an exemplary embodiment, the first lens has positive or negative refractive power; the second lens has positive or negative refractive power; the third lens may have positive refractive power, and an image-side surface thereof may be a convex surface; the fourth lens has positive or negative refractive power; the fifth lens has positive or negative refractive power; the sixth lens has positive or negative refractive power; and an object-side surface of the seventh lens may be a convex surface, and an image-side surface thereof may be a concave surface. By rationally controlling the positive and negative distribution of the refractive power and the surface curvature of each component in the lens system, the low-order aberrations of the system are effectively compensated and the sensitivity of the optical imaging lens assembly to tolerance may be reduced.

In an exemplary embodiment, the above optical imaging lens assembly may further include a stop. The stop may be disposed at an appropriate position as required, for example, between the third lens and the fourth lens. Optionally, the above optical imaging lens assembly may further include an optical filter for correcting the color deviation and/or a protective glass for protecting the photosensitive element located on an imaging plane.

In an exemplary embodiment, the optical imaging lens assembly according to the present disclosure may satisfy: FOV≥134.56°, where FOV is a maximum field-of-view of the optical imaging lens assembly. By controlling FOV to satisfy the conditional expression FOV≥134.56°, it is beneficial to achieve the wide-angle characteristics of the optical imaging lens assembly.

In an exemplary embodiment, the optical imaging lens assembly according to the present disclosure may satisfy: $0.54 \leq DT62/DT72$, where DT62 is an effective half-aperture of an image-side surface of the sixth lens, and DT72 is an effective half-aperture of the image-side surface of the seventh lens. The optical imaging lens assembly satisfies the conditional expression $0.54 \leq DT62/DT72$, which is beneficial to control the aperture of the sixth lens and the aperture of the seventh lens. More specifically, DT62 and DT72 may satisfy: $0.54 \leq DT62/DT72 < 0.8$.

In an exemplary embodiment, the optical imaging lens assembly according to the present disclosure may satisfy: $ImgH*EPD > 2$ mm$^2$, where ImgH is half of a diagonal length of an effective pixel area on an imaging plane of the optical imaging lens assembly, and EPD is an entrance pupil diameter of the optical imaging lens assembly. By controlling the product of image height and entrance pupil diameter, it is beneficial to make the optical imaging lens assembly have the characteristics of a large image plane. As an example, the optical imaging lens assembly may further satisfy the conditional expression $0.54 \leq DT62/DT72$. By simultaneously controlling the aperture of the sixth lens, the aperture of the seventh lens, the image height and the entrance pupil diameter, it is beneficial to reduce the diameter of the optical imaging lens assembly at the middle position along the optical axis while ensuring the image height. More specifically, ImgH and EPD may further satisfy: 2.6 mm$^2$<ImgH*EPD<3.1 mm$^2$.

In an exemplary embodiment, the optical imaging lens assembly according to the present disclosure may satisfy: ImgH/tan(FOV/4)<4.7 mm. By matching the image height with the maximum field-of-view, it is beneficial to ensure the angular resolution of the optical imaging lens assembly. More specifically, half of a diagonal length ImgH of an effective pixel area on an imaging plane of the optical imaging lens assembly and a maximum field-of-view FOV of the optical imaging lens assembly may satisfy 3.4 mm<ImgH/tan(FOV/4)<4.6 mm.

In an exemplary embodiment, the optical imaging lens assembly according to the present disclosure may satisfy: $0 < ET3/CT3 \leq 0.9$, where CT3 is a center thickness of the third lens along the optical axis, and ET3 is an edge thickness of the third lens. By controlling the ratio of the edge thickness to the center thickness of the third lens, it is beneficial to make the focal length of the third lens greater than zero, which in turn helps the optical imaging lens assembly to have better image quality under different environmental temperatures. More specifically, CT3 and ET3 may satisfy: $0.3 < ET3/CT3 \leq 0.9$.

In an exemplary embodiment, the optical imaging lens assembly according to the present disclosure may satisfy: $0 < f/f3 < 1$, where f is a total effective focal length of the optical imaging lens assembly, and f3 is an effective focal length of the third lens. By controlling the total effective focal length and the effective focal length of the third lens, it is beneficial to reasonably allocate the focal length of the lens system, thereby ensuring that the optical imaging lens assembly has better image quality. More specifically, f and f3 may satisfy: $0.4 < f/f3 < 0.9$. As an example, the optical imaging lens assembly further satisfies the conditional expression $0 < ET3/CT3 \leq 0.9$.

In an exemplary embodiment, the optical imaging lens assembly according to the present disclosure may satisfy: $0 < SAG72/SAG71 \leq 1.11$, where SAG71 is an on-axis distance from an intersection of the object-side surface of the seventh lens and the optical axis to a vertex of an effective radius of the object-side surface of the seventh lens, and SAG72 is an on-axis distance from an intersection of the image-side surface of the seventh lens and the optical axis to a vertex of an effective radius of the image-side surface of the seventh lens. By controlling the ratio of the sagittal heights of the two surfaces of the seventh lens, it is beneficial to control the chief ray angle, while ensuring the imaging performance of the optical imaging lens assembly. More specifically, SAG71 and SAG72 may satisfy: $0.45 < SAG72/SAG71 \leq 1.11$.

In an exemplary embodiment, the optical imaging lens assembly according to the present disclosure may satisfy: $0.4 < CT3/f < 1.4$. By controlling the ratio of the center thickness of the third lens to the total effective focal length, it is beneficial to reasonably allocate the length of the third lens along the optical axis. When the total length of the optical imaging lens assembly is constant, reasonable setting of the thickness of the third lens may leave space for the lenses arranged in the object side (front) and image side (rear) of the third lens. In addition, it may ensure that the specific gravity of the optical imaging lens assembly is relatively uniform on the front and back sides of the stop. More specifically, a center thickness CT3 of the third lens along the optical axis and a total effective focal length f of the optical imaging lens assembly may satisfy $0.6 < CT3/f < 1.3$.

In an exemplary embodiment, the optical imaging lens assembly according to the present disclosure may satisfy: $0<(CT2+CT3+CT4)/TTL<0.6$, where CT2 is a center thickness of the second lens along the optical axis, CT3 is a center thickness of the third lens along the optical axis, CT4 is a center thickness of the fourth lens along the optical axis, and TTL is an on-axis distance from an object-side surface of the first lens to an imaging plane. By controlling the proportion of the thicknesses of the second lens, the third lens and the fourth lens in the total optical length, it is beneficial to allocate effective space for each lens of the optical imaging lens assembly, so that the function of each lens may be exerted to a great extent, thereby making the optical imaging lens assembly have better image quality. More specifically, CT2, CT3, CT4 and TTL may satisfy: $0.3<(CT2+CT3+CT4)/TTL<0.5$.

In an exemplary embodiment, the optical imaging lens assembly according to the present disclosure may satisfy: $5\leq N1+N3+N4<5.5$, where N1 is a refractive index of the first lens, N3 is a refractive index of the third lens, and N4 is a refractive index of the fourth lens. By controlling the sum of the refractive index of the first lens, the refractive index of the third lens, and the refractive index of the fourth lens, it is beneficial for the optical imaging lens assembly to have a better image quality with a smaller diameter. More specifically, N1, N3 and N4 may satisfy: $5\leq N1+N3+N4<5.2$.

In an exemplary embodiment, the optical imaging lens assembly according to the present disclosure may satisfy: $0<R14/R13\leq 1.34$, where R13 is a radius of curvature of the object-side surface of the seventh lens, and R14 is a radius of curvature of the image-side surface of the seventh lens. By controlling the ratio of the curvature radii of the two surfaces of the seventh lens, the optical imaging lens assembly may better achieve the deflection of the optical path, and the advanced spherical aberration generated by the optical imaging lens assembly may be better compensated. More specifically, R13 and R14 may satisfy: $0.1<R14/R13\leq 1.34$.

In an exemplary embodiment, the optical imaging lens assembly according to the present disclosure may satisfy: $40<(V1+V3+V4)/3<55$, where V1 is an Abbe number of the first lens, V3 is an Abbe number of the third lens, and V4 is an Abbe number of the fourth lens. By controlling the sum of the Abbe number of the first lens, the Abbe number of the third lens and the Abbe number of the fourth lens, it is beneficial to reasonably control the degree of dispersion of the optical imaging lens assembly, and improve the ability to correct the chromatic aberration of the optical imaging lens assembly, so that the optical imaging lens may achieve better imaging effects. More specifically, V1, V3 and V4 may satisfy: $41.5<(V1+V3+V4)/3<54.5$.

In an exemplary embodiment, the optical imaging lens assembly according to the present disclosure may satisfy: $0<T67/T12<1.3$, where T12 is a spaced interval between the first lens and the second lens along the optical axis, and T67 is a spaced interval between the sixth lens and the seventh lens along the optical axis. By controlling the ratio of T67 to T12, the field curvature produced by these four lenses may be compensated with the field curvature produced by other lenses. Also, it is beneficial to control the field curvature contributed by each field-of-view of the optical imaging lens assembly in a reasonable range, even if the temperature changes. More specifically, T12 and T67 may satisfy: $0<T67/T12<1.3$.

The optical imaging lens assembly according to the above embodiments of the present disclosure may employ a plurality of lenses, such as seven lenses as described above. By properly configuring the refractive power of each lens, the surface shape, the material, the center thickness of each lens, and spaced intervals along the optical axis between the lenses, the size and the sensitivity of the optical imaging lens assembly may be effectively reduced, the temperature adaptability and the workability of the optical imaging lens assembly may be improved, such that the optical imaging lens assembly is more advantageous for production processing and may be applied to portable electronic products. At the same time, the optical imaging lens assembly of the present disclosure also has excellent optical performances such as large image plane, large viewing angle, and low aberration.

In the embodiments of the present disclosure, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking seven lenses as an example, the optical imaging lens assembly is not limited to include seven lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly includes a first lens E1, a second lens E2, a third lens E3, a stop STO, a fourth lens E4, a fifth lens E5, a sixth lens E6, a seventh lens E7 and an optical filter E8, which are sequentially arranged from an object side to an image side along an optical axis. The first lens E1 and the third lens E3 are made of glass material.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/Distance | Material Refractive index | Abbe number | Focal length | Conic coefficient |
|---|---|---|---|---|---|---|---|
| OBJ | Spherical | Infinite | Infinite | | | | |
| S1 | Aspheric | 16.9331 | 0.8000 | 1.76 | 52.32 | −3.78 | 0.0000 |
| S2 | Aspheric | 2.3979 | 1.5481 | | | | 0.0000 |
| S3 | Aspheric | 8.0081 | 0.6000 | 1.55 | 56.11 | −19.09 | −23.2094 |
| S4 | Aspheric | 4.3774 | 0.2113 | | | | −33.0533 |
| S5 | Aspheric | 6.0446 | 2.4525 | 1.84 | 42.73 | 3.97 | 0.0000 |
| S6 | Aspheric | −6.0446 | 0.1103 | | | | 0.0000 |
| STO | Spherical | Infinite | 0.0899 | | | | |
| S7 | Aspheric | 3.0360 | 0.8373 | 1.55 | 56.11 | 2.70 | 3.5410 |
| S8 | Aspheric | −2.5920 | 0.0350 | | | | −12.8428 |
| S9 | Aspheric | −49.1867 | 0.4000 | 1.67 | 20.37 | −3.06 | 30.0000 |
| S10 | Aspheric | 2.1336 | 0.3223 | | | | −9.8226 |
| S11 | Aspheric | 8.0230 | 0.6598 | 1.55 | 56.11 | 5.54 | 21.8647 |
| S12 | Aspheric | −4.7114 | 0.9757 | | | | −12.6371 |
| S13 | Aspheric | 14.3669 | 0.5000 | 1.55 | 56.11 | −5.53 | 2.3690 |
| S14 | Aspheric | 2.4306 | 0.4268 | | | | −8.1950 |
| S15 | Spherical | Infinite | 0.2100 | 1.53 | 55.77 | | |
| S16 | Spherical | Infinite | 0.3196 | | | | |
| S17 | Spherical | Infinite | | | | | |

In example 1, a total effective focal length f of the optical imaging lens assembly is 2.32 mm, an aperture number Fno of the optical imaging lens assembly is 2.50, an on-axis distance TTL from the object-side surface S1 of the first lens E1 to the imaging plane S17 is 10.50 mm, half of a diagonal length ImgH of an effective pixel area on the imaging plane S17 is 3.00 mm, and half of a maximal field-of-view Semi-FOV is 75.14°.

In example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

TABLE 2

| Surface number | A4 | A6 | A8 | A10 | A12 | A14 | A16 | A18 | A20 |
|---|---|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S2 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |

TABLE 2-continued

| Surface number | A4 | A6 | A8 | A10 | A12 | A14 | A16 | A18 | A20 |
|---|---|---|---|---|---|---|---|---|---|
| S3 | −1.2263E−03 | −2.3126E−03 | −1.0594E−03 | 6.7679E−04 | −1.5570E−04 | 1.7636E−05 | −7.5313E−07 | 0.0000E+00 | 0.0000E+00 |
| S4 | 5.5978E−02 | −3.9373E−02 | 2.7506E−02 | −1.5167E−02 | 5.7062E−03 | −1.2376E−03 | 1.1729E−04 | 0.0000E+00 | 0.0000E+00 |
| S5 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S7 | −6.7404E−03 | −4.7812E−01 | 1.5534E−01 | −3.7991E−01 | 4.8242E−01 | −3.2910E−01 | 9.0173E−02 | 0.0000E+00 | 0.0000E+00 |
| S8 | −2.6023E−02 | 4.0654E−02 | −2.5468E−01 | 4.3676E−01 | −4.4107E−01 | 2.4144E−01 | −5.4829E−02 | 0.0000E+00 | 0.0000E+00 |
| S9 | −6.4992E−02 | 1.6239E−01 | −5.0125E−01 | 7.8749E−01 | −7.4766E−01 | 3.9658E−01 | −8.6817E−02 | 0.0000E+00 | 0.0000E+00 |
| S10 | −1.0675E−02 | 1.0169E−01 | −1.8354E−01 | 1.9636E−01 | −1.3057E−01 | 4.9964E−02 | −8.1778E−03 | 0.0000E+00 | 0.0000E+00 |
| S11 | −4.5545E−02 | 7.5563E−02 | −1.0850E−01 | 1.1484E−01 | −7.3959E−02 | 2.5692E−02 | −3.8699E−03 | 0.0000E+00 | 0.0000E+00 |
| S12 | −3.4509E−02 | 2.5105E−02 | −4.1761E−03 | −1.1033E−02 | 1.4361E−02 | −5.8945E−03 | 7.8788E−04 | 0.0000E+00 | 0.0000E+00 |
| S13 | −1.6270E−01 | 4.8215E−02 | 3.0547E−03 | −1.4744E−02 | 7.0183E−03 | −1.3162E−03 | 8.8359E−05 | 0.0000E+00 | 0.0000E+00 |
| S14 | −9.0086E−02 | 4.0185E−02 | −1.2929E−02 | 2.3546E−03 | −2.2752E−04 | 8.8986E−06 | 3.0959E−08 | 0.0000E+00 | 0.0000E+00 |

Figure 2D:
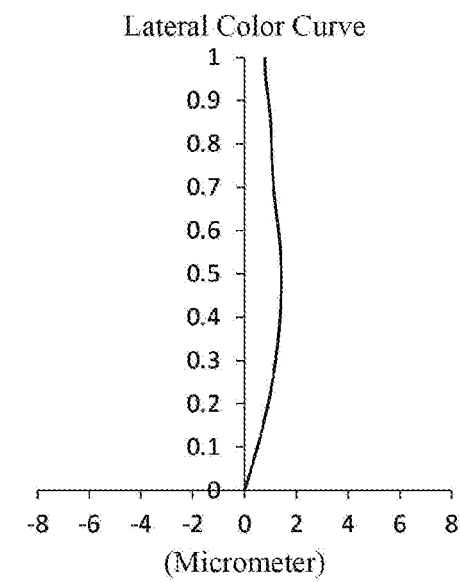

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different field-of-views. FIG. 2D illustrates a lateral color curve of the optical imaging lens assembly according to example 1, representing deviations of different image heights on an imaging plane after light passes through the lens assembly. It can be seen from FIG. 2A to FIG. 2D that the optical imaging lens assembly provided in example 1 may achieve good image quality.

Example 2

Figure 3:
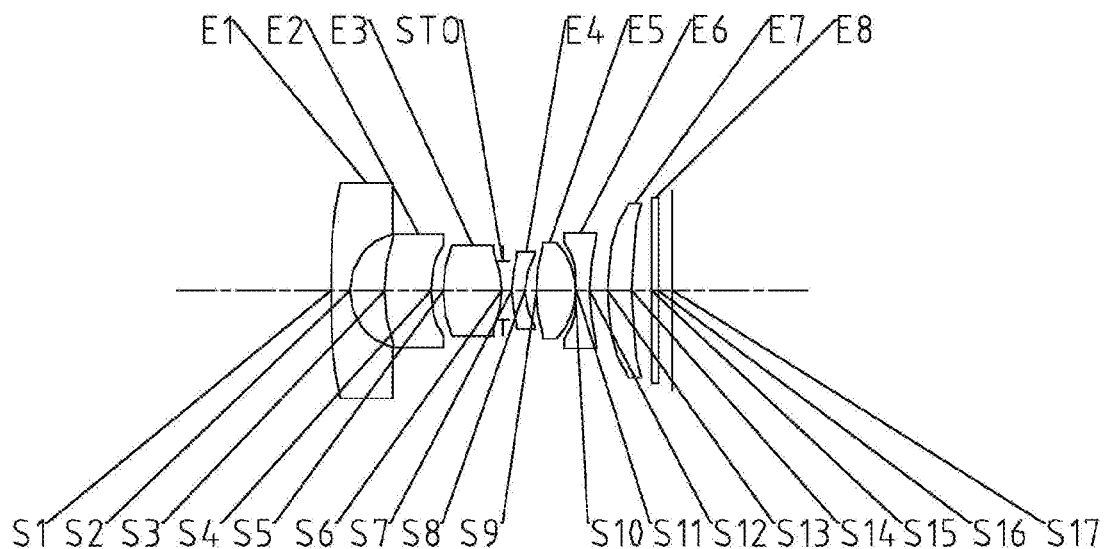
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly includes a first lens E1, a second lens E2, a third lens E3, a stop STO, a fourth lens E4, a fifth lens E5, a sixth lens E6, a seventh lens E7 and an optical filter E8, which are sequentially arranged from an object side to an image side along an optical axis. The first lens E1 and the third lens E3 are made of glass material.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a convex surface, and an image-side surface S14 thereof is a concave surface. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

In example 2, a total effective focal length f of the optical imaging lens assembly is 2.09 mm, an aperture number Fno of the optical imaging lens assembly is 2.30, an on-axis distance TTL from the object-side surface S1 of the first lens E1 to the imaging plane S17 is 10.38 mm, half of a diagonal length ImgH of an effective pixel area on the imaging plane S17 is 2.87 mm, and half of a maximal field-of-view Semi-FOV is 80.00°.

Table 3 is a table illustrating basic parameters of the optical imaging lens assembly of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 43.7343 | 0.5776 | 1.76 | 52.30 | −2.62 | 0.0000 |
| S2 | Aspheric | 1.8853 | 1.0546 | | | | 0.0000 |
| S3 | Aspheric | 5.5704 | 1.4078 | 1.67 | 19.00 | −30.31 | 0.0000 |
| S4 | Aspheric | 3.9336 | 0.3779 | | | | 0.0000 |
| S5 | Aspheric | 4.6894 | 1.7746 | 1.80 | 46.60 | 2.32 | 0.0000 |

TABLE 3-continued

| Surface number | Surface type | Radius of curvature | Thickness/ Distance | Material Refractive index | Abbe number | Focal length | Conic coefficient |
|---|---|---|---|---|---|---|---|
| S6 | Aspheric | −2.5842 | 0.0300 | | | | 0.0000 |
| STO | Spherical | Infinite | 0.2744 | | | | |
| S7 | Aspheric | 3.0465 | 0.4000 | 1.60 | 25.90 | −6.97 | 0.0000 |
| S8 | Aspheric | 1.6850 | 0.3509 | | | | 0.0000 |
| S9 | Aspheric | 4.4855 | 1.1833 | 1.54 | 56.00 | 2.97 | 0.0000 |
| S10 | Aspheric | −2.3047 | 0.0300 | | | | 0.0000 |
| S11 | Aspheric | −9.0564 | 0.4000 | 1.60 | 25.90 | −4.64 | 0.0000 |
| S12 | Aspheric | 4.1734 | 0.5459 | | | | 0.0000 |
| S13 | Aspheric | 5.0786 | 0.7353 | 1.54 | 56.00 | 90.42 | 0.0000 |
| S14 | Aspheric | 5.3708 | 0.6079 | | | | 0.0000 |
| S15 | Spherical | Infinite | 0.2100 | 1.53 | 55.77 | | |
| S16 | Spherical | Infinite | 0.4200 | | | | |
| S17 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 1.6704E−04 | 9.7364E−04 | −2.4392E−04 | 3.1866E−05 | −2.4310E−06 | 1.0176E−07 | −1.7685E−09 | −2.8180E−12 | 0.0000E+00 |
| S2 | −2.1898E−03 | −1.1934E−02 | 4.6142E−02 | −7.7210E−02 | 7.5368E−02 | −4.3963E−02 | 1.5182E−02 | −2.8649E−03 | 2.2850E−04 |
| S3 | 7.9467E−04 | −4.2826E−05 | 1.4061E−03 | −8.9454E−04 | 2.9104E−04 | −7.4923E−05 | 8.6561E−06 | 0.0000E+00 | 0.0000E+00 |
| S4 | 3.6048E−02 | 3.1236E−03 | 2.1838E−04 | 3.1800E−03 | −6.3541E−03 | 2.9098E−03 | −2.5711E−04 | −6.4584E−05 | 0.0000E+00 |
| S5 | 1.6008E−02 | −1.3878E−03 | 4.1012E−03 | −4.6413E−03 | 1.7625E−03 | −1.8217E−04 | −1.7674E−05 | 0.0000E+00 | 0.0000E+00 |
| S6 | 3.1610E−02 | −1.6195E−02 | 9.1215E−03 | −4.7200E−03 | 1.9908E−03 | −5.0618E−04 | 5.6947E−05 | 0.0000E+00 | 0.0000E+00 |
| S7 | −2.6513E−02 | 1.3797E−02 | −1.2822E−02 | −1.4400E−04 | −2.6231E−03 | 5.8306E−03 | −2.4621E−03 | 0.0000E+00 | 0.0000E+00 |
| S8 | −1.1012E−01 | 7.1913E−02 | −5.9449E−02 | 2.5522E−02 | −7.5209E−03 | 2.0107E−03 | −4.8318E−04 | 0.0000E+00 | 0.0000E+00 |
| S9 | −1.6749E−02 | 6.7069E−03 | 4.8360E−03 | −4.9163E−03 | −4.5795E−04 | 1.5052E−03 | −3.4626E−04 | 0.0000E+00 | 0.0000E+00 |
| S10 | −3.1747E−02 | 6.1499E−02 | −5.8467E−02 | 3.1826E−02 | −1.1924E−02 | 2.3888E−03 | −1.7737E−05 | −3.6230E−05 | 0.0000E+00 |
| S11 | −9.9424E−02 | 8.6422E−02 | −6.3718E−02 | 2.6953E−02 | −1.0307E−02 | 3.0802E−03 | −3.6392E−04 | 2.9686E−06 | −4.1194E−06 |
| S12 | −7.0388E−02 | 5.8054E−02 | −2.7420E−02 | 5.4050E−03 | 3.8063E−04 | −3.2301E−04 | 3.7330E−05 | 0.0000E+00 | 0.0000E+00 |
| S13 | −5.1340E−02 | 2.9286E−02 | −8.7017E−03 | 1.5805E−03 | −1.7469E−04 | 1.0752E−05 | −2.6292E−07 | −9.9545E−10 | −1.5925E−10 |
| S14 | −4.7345E−02 | 1.7179E−02 | −4.9112E−03 | 1.1325E−03 | −1.7398E−04 | 1.5083E−05 | −5.3420E−07 | −2.1661E−09 | 0.0000E+00 |

Figure 4A:
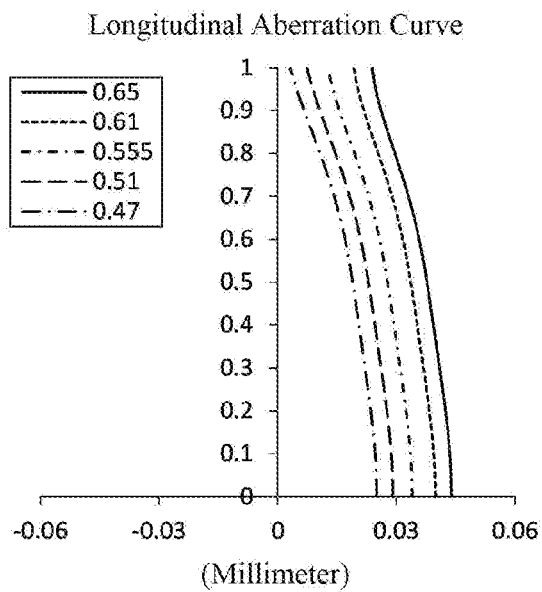
FIGS. 4A to 4D illustrate a longitudinal aberration curve, an astigmatic curve, a distortion curve, and a lateral color curve of the optical imaging lens assembly of the example 2, respectively.
Figure 4B:
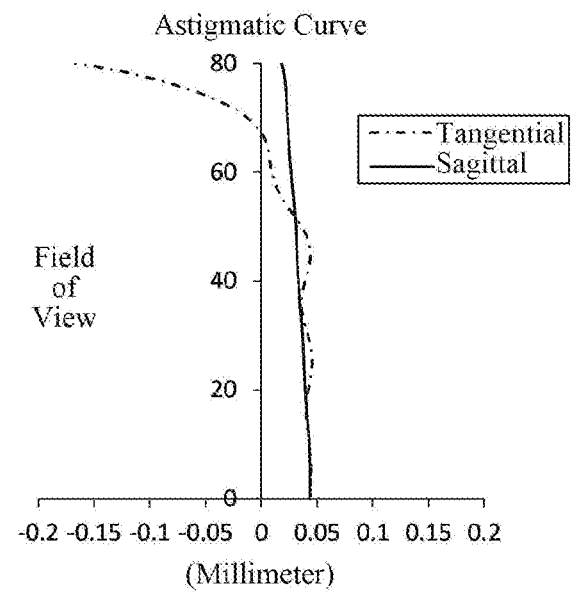
Figure 4C:
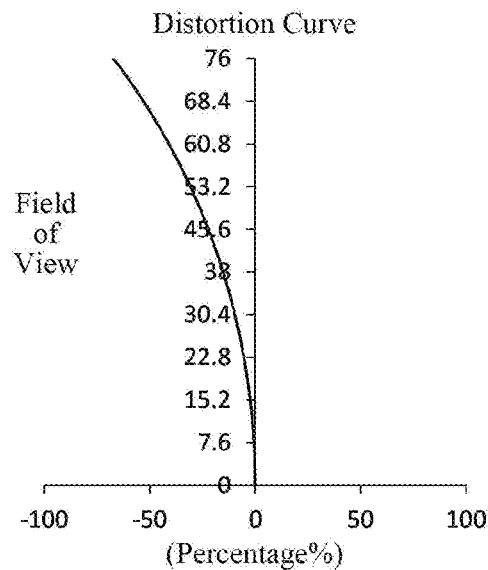
Figure 4D:
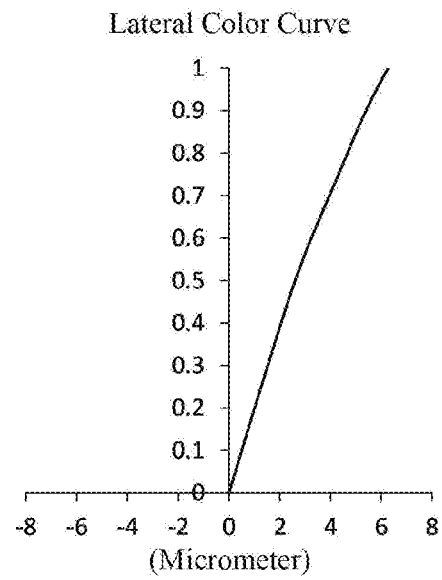

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different field-of-views. FIG. 4D illustrates a lateral color curve of the optical imaging lens assembly according to example 2, representing deviations of different image heights on an imaging plane after light passes through the lens assembly. It can be seen from FIG. 4A to FIG. 4D that the optical imaging lens assembly provided in example 2 may achieve good image quality.

Example 3

Figure 5:
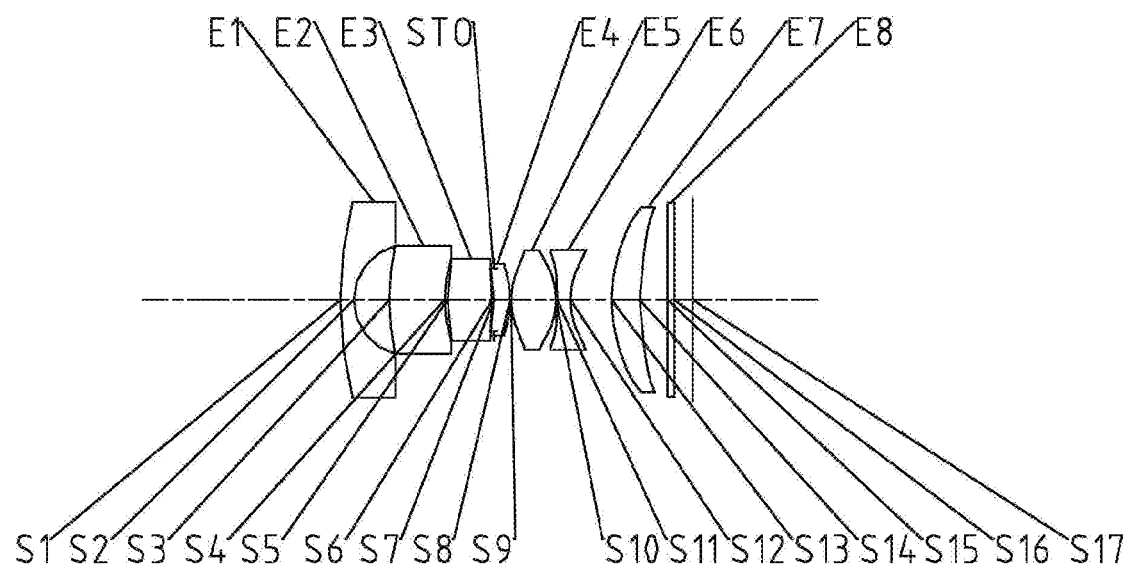
FIG. 5 illustrates a schematic structural view of an optical imaging lens assembly according to example 3 of the present disclosure.

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a first lens E1, a second lens E2, a third lens E3, a stop STO, a fourth lens E4, a fifth lens E5, a sixth lens E6, a seventh lens E7 and an optical filter E8, which are sequentially arranged from an object side to an image side along an optical axis. The first lens E1 and the third lens E3 are made of glass material.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a convex surface, and an image-side surface S14 thereof is a concave surface. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

In example 3, a total effective focal length f of the optical imaging lens assembly is 2.17 mm, an aperture number Fno of the optical imaging lens assembly is 2.38, an on-axis distance TTL from the object-side surface S1 of the first lens E1 to the imaging plane S17 is 10.50 mm, half of a diagonal length ImgH of an effective pixel area on the imaging plane S17 is 3.00 mm, and half of a maximal field-of-view Semi-FOV is 79.20°.

Table 5 is a table illustrating basic parameters of the optical imaging lens assembly of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

from FIG. 6A to FIG. 6D that the optical imaging lens assembly provided in example 3 may achieve good image quality.

Example 4

Figure 7:
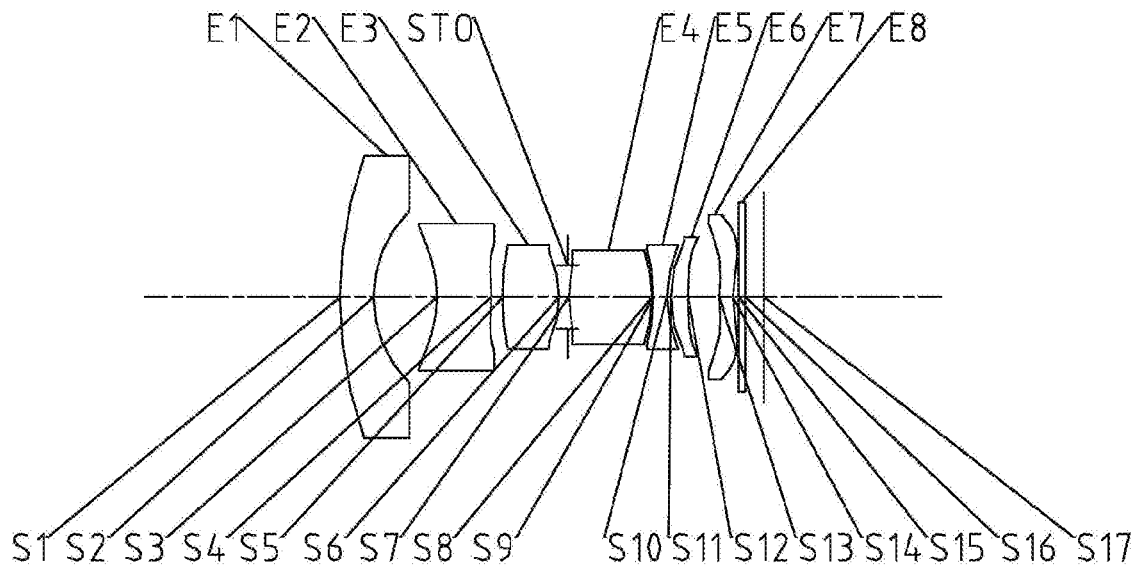
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 11.8704 | 0.4000 | 1.76 | 51.90 | −2.59 | 0.0000 |
| S2 | Aspheric | 1.6631 | 1.0643 | | | | 0.0000 |
| S3 | Aspheric | 8.4008 | 1.6439 | 1.67 | 19.00 | −16.65 | 0.0000 |
| S4 | Aspheric | 4.4316 | 0.0882 | | | | 0.0000 |
| S5 | Aspheric | 6.3432 | 1.3475 | 1.83 | 28.90 | 5.14 | 0.0000 |
| S6 | Aspheric | −11.9977 | 0.0300 | | | | 0.0000 |
| STO | Spherical | Infinite | 0.0000 | | | | |
| S7 | Aspheric | −3.2386 | 0.4854 | 1.55 | 52.20 | 52.34 | 0.0000 |
| S8 | Aspheric | −3.0656 | 0.0300 | | | | 0.0000 |
| S9 | Aspheric | 1.9668 | 1.3371 | 1.54 | 56.00 | 2.24 | 0.0000 |
| S10 | Aspheric | −2.4766 | 0.0358 | | | | 0.0000 |
| S11 | Aspheric | −54.1931 | 0.4000 | 1.63 | 23.30 | −3.38 | 0.0000 |
| S12 | Aspheric | 2.2425 | 1.2225 | | | | 0.0000 |
| S13 | Aspheric | 4.2506 | 0.8391 | 1.54 | 56.00 | 25.25 | 0.0000 |
| S14 | Aspheric | 5.7144 | 0.8262 | | | | 0.0000 |
| S15 | Spherical | Infinite | 0.2100 | 1.52 | 64.20 | | |
| S16 | Spherical | Infinite | 0.5400 | | | | |
| S17 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S2 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S3 | 1.5577E−03 | −5.9022E−05 | 2.6233E−04 | −3.9159E−04 | 1.8892E−04 | −3.1758E−05 | 1.0717E−07 | 0.0000E+00 | 0.0000E+00 |
| S4 | 2.5313E−02 | 5.8882E−04 | −7.7091E−03 | 8.1372E−03 | −7.0808E−03 | 1.3023E−03 | 1.4522E−04 | 0.0000E+00 | 0.0000E+00 |
| S5 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S7 | 1.3020E−01 | −1.1416E−01 | 1.0444E−01 | −8.9517E−02 | 5.0028E−02 | −2.0761E−02 | 3.7001E−03 | 0.0000E+00 | 0.0000E+00 |
| S8 | 2.5093E−02 | −2.3390E−02 | 1.1937E−02 | 1.7862E−02 | −4.6932E−02 | 3.5272E−02 | −9.8451E−03 | 0.0000E+00 | 0.0000E+00 |
| S9 | −7.6484E−02 | 3.4390E−02 | −2.0435E−02 | 7.5236E−03 | −2.2596E−03 | 6.5701E−04 | −1.1479E−04 | 0.0000E+00 | 0.0000E+00 |
| S10 | −5.3122E−02 | 7.9029E−02 | −8.3813E−02 | 6.7215E−02 | −3.4758E−02 | 1.1027E−02 | −1.2364E−03 | 0.0000E+00 | 0.0000E+00 |
| S11 | −8.3822E−02 | 5.0425E−02 | −4.5031E−02 | 3.6530E−02 | −2.0298E−02 | 6.4345E−03 | −8.4284E−04 | 0.0000E+00 | 0.0000E+00 |
| S12 | −1.9570E−02 | −1.3420E−02 | 2.5912E−02 | −2.1869E−02 | 1.0054E−02 | −2.5392E−03 | 2.7768E−04 | 0.0000E+00 | 0.0000E+00 |
| S13 | −1.1764E−02 | 2.5620E−03 | −2.3006E−04 | −1.7074E−05 | 6.9685E−06 | −6.1409E−07 | 1.6612E−08 | 0.0000E+00 | 0.0000E+00 |
| S14 | −1.6725E−02 | 2.8812E−03 | −4.6409E−04 | 1.1885E−04 | −2.4230E−05 | 2.7527E−06 | −1.2325E−07 | 0.0000E+00 | 0.0000E+00 |

Figure 6A:
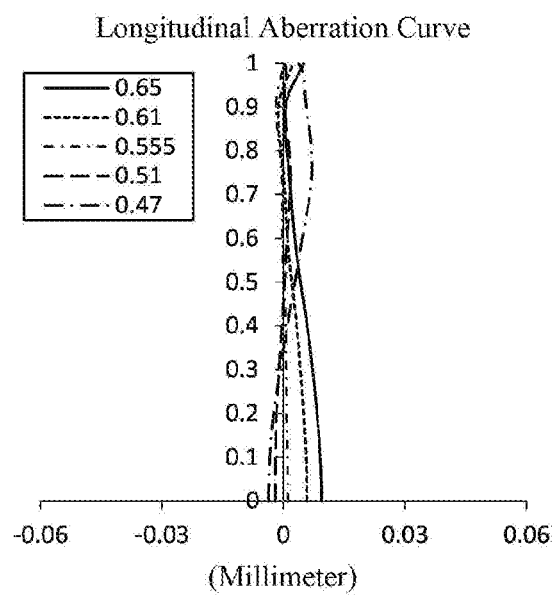
FIGS. 6A to 6D illustrate a longitudinal aberration curve, an astigmatic curve, a distortion curve, and a lateral color curve of the optical imaging lens assembly of the example 3, respectively.
Figure 6B:
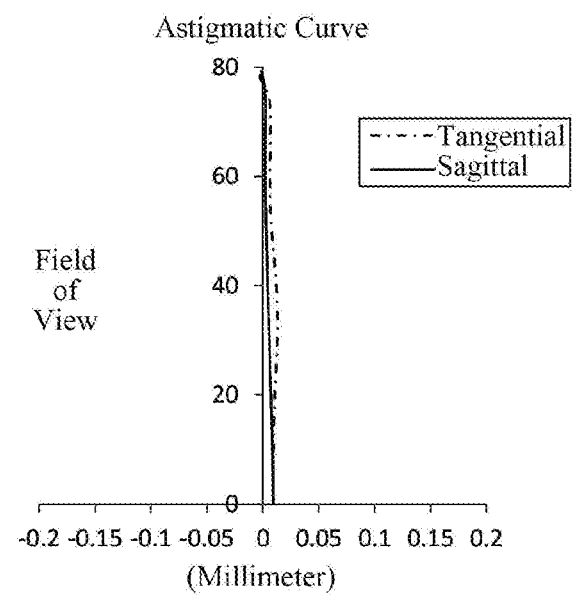
Figure 6C:
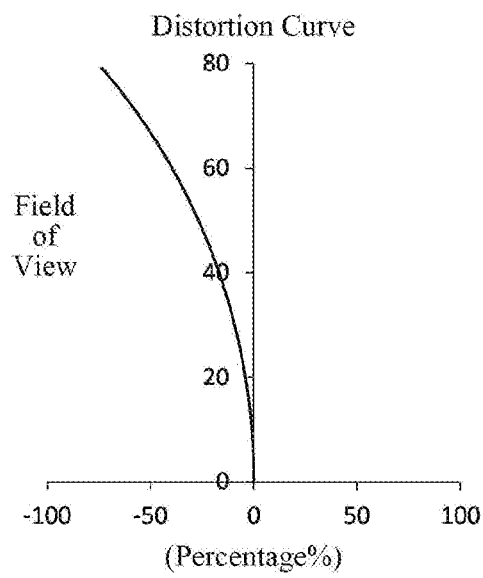
Figure 6D:
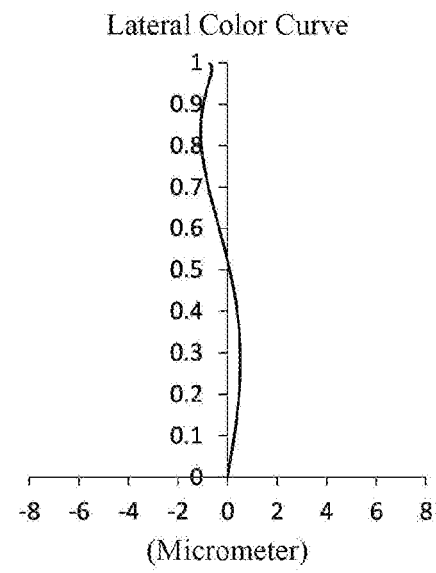

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different field-of-views. FIG. 6D illustrates a lateral color curve of the optical imaging lens assembly according to example 3, representing deviations of different image heights on an imaging plane after light passes through the lens assembly. It can be seen As shown in FIG. 7, the optical imaging lens assembly includes a first lens E1, a second lens E2, a third lens E3, a stop STO, a fourth lens E4, a fifth lens E5, a sixth lens E6, a seventh lens E7 and an optical filter E8, which are sequentially arranged from an object side to an image side along an optical axis. The first lens E1 and the third lens E3 are made of glass material.

The first lens E1 has negative refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a convex surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

In example 4, a total effective focal length f of the optical imaging lens assembly is 2.41 mm, an aperture number Fno of the optical imaging lens assembly is 2.40, an on-axis distance TTL from the object-side surface S1 of the first lens E1 to the imaging plane S17 is 12.52 mm, half of a diagonal length ImgH of an effective pixel area on the imaging plane S17 is 3.00 mm, and half of a maximal field-of-view Semi-FOV is 80.47°.

Table 7 is a table illustrating basic parameters of the optical imaging lens assembly of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 12.4746 | 0.9882 | 1.78 | 49.61 | −6.83 | 0.0000 |
| S2 | Aspheric | 3.5898 | 1.8766 | | | | 0.0000 |
| S3 | Aspheric | −3.6288 | 1.6000 | 1.60 | 40.10 | −12.02 | −2.2298 |
| S4 | Aspheric | −8.4162 | 0.3407 | | | | 18.0313 |
| S5 | Aspheric | 13.6298 | 1.6598 | 1.55 | 56.11 | 5.01 | 22.7045 |
| S6 | Aspheric | −3.2780 | 0.2620 | | | | −0.2698 |
| STO | Spherical | Infinite | 0.0300 | | | | |
| S7 | Aspheric | 4.6531 | 2.4508 | 1.76 | 52.33 | 3.40 | 0.0000 |
| S8 | Aspheric | −4.4767 | 0.0478 | | | | 0.0000 |
| S9 | Aspheric | −5.4305 | 0.4000 | 1.67 | 20.37 | −3.10 | −9.4610 |
| S10 | Aspheric | 3.4448 | 0.1139 | | | | −9.7546 |
| S11 | Aspheric | 2.8587 | 0.5081 | 1.55 | 56.11 | 7.88 | −6.4432 |
| S12 | Aspheric | 7.9605 | 0.9212 | | | | 10.3776 |
| S13 | Aspheric | 3.5609 | 0.4000 | 1.55 | 56.11 | −12.75 | −34.1497 |
| S14 | Aspheric | 2.2510 | 0.1707 | | | | −9.6467 |
| S15 | Spherical | Infinite | 0.2100 | 1.53 | 55.77 | | |
| S16 | Spherical | Infinite | 0.5398 | | | | |
| S17 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S2 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S3 | 1.5601E−03 | −1.3179E−03 | 9.2201E−04 | −2.1877E−04 | 2.0293E−05 | −1.5328E−07 | −6.5487E−08 | 0.0000E+00 | 0.0000E+00 |
| S4 | 4.3375E−02 | −9.2028E−03 | 7.6069E−03 | −3.0326E−03 | 1.3220E−03 | −4.4039E−04 | 6.0490E−05 | 0.0000E+00 | 0.0000E+00 |
| S5 | 2.3559E−02 | −1.7653E−02 | 1.2591E−02 | −5.3637E−03 | 1.0693E−03 | −1.0997E−04 | 1.0046E−05 | 0.0000E+00 | 0.0000E+00 |
| S6 | −9.0003E−04 | −5.2128E−03 | 6.9304E−03 | −5.9020E−03 | 2.7117E−03 | −6.3806E−04 | 6.1216E−05 | 0.0000E+00 | 0.0000E+00 |
| S7 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S9 | 2.8655E−02 | −6.7797E−02 | 6.5528E−02 | −3.8034E−02 | 1.2726E−02 | −2.3598E−03 | 2.0667E−04 | 0.0000E+00 | 0.0000E+00 |
| S10 | 2.3602E−02 | 1.2730E−02 | −3.3708E−02 | 2.8513E−02 | −1.2451E−02 | 2.7135E−03 | −2.3375E−04 | 0.0000E+00 | 0.0000E+00 |
| S11 | −8.8040E−02 | 1.5949E−01 | −1.3384E−01 | 7.0344E−02 | −2.3009E−02 | 4.2914E−03 | −3.5820E−04 | 0.0000E+00 | 0.0000E+00 |
| S12 | −8.6287E−02 | 9.1947E−02 | −3.7186E−02 | 6.2274E−03 | 9.2670E−04 | −5.7445E−04 | 6.6301E−05 | 0.0000E+00 | 0.0000E+00 |
| S13 | −7.3603E−02 | −1.2052E−02 | 2.7354E−02 | −1.2628E−02 | 2.7583E−03 | −2.8342E−04 | 1.0578E−05 | 0.0000E+00 | 0.0000E+00 |
| S14 | −5.2205E−02 | 8.2597E−03 | 1.5755E−04 | −2.0585E−04 | −8.2693E−05 | 2.9170E−05 | −2.2571E−06 | 0.0000E+00 | 0.0000E+00 |

Figure 8A:
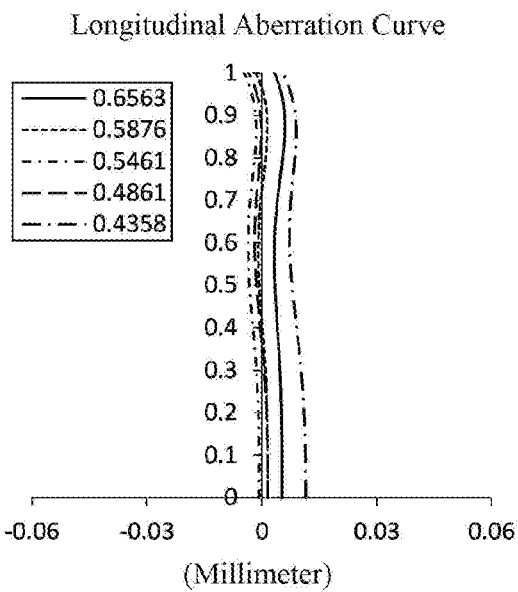
FIGS. 8A to 8D illustrate a longitudinal aberration curve, an astigmatic curve, a distortion curve, and a lateral color curve of the optical imaging lens assembly of the example 4, respectively.
Figure 8B:
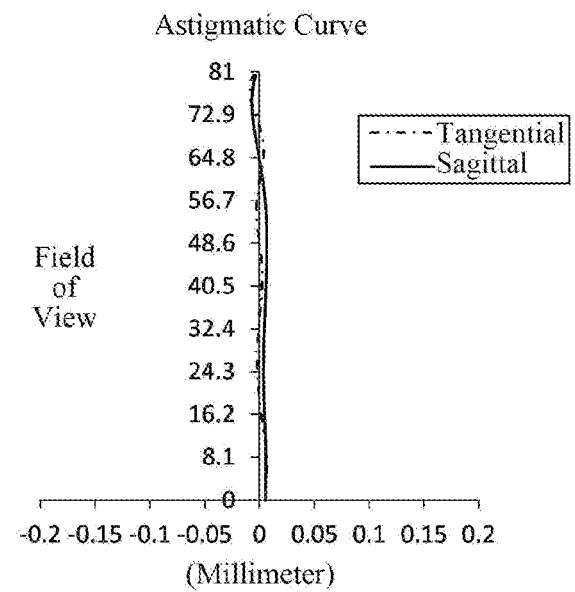
Figure 8C:
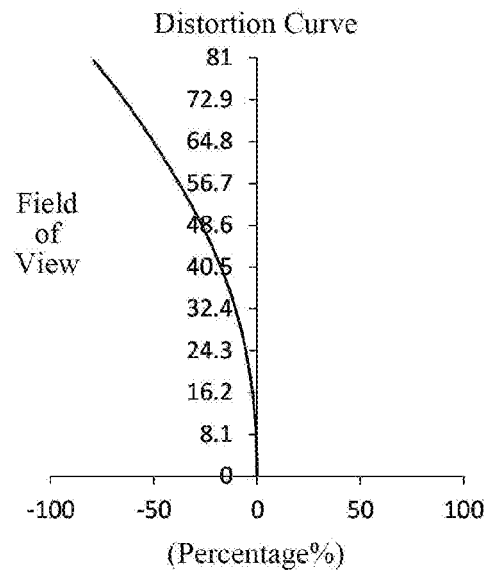
Figure 8D:
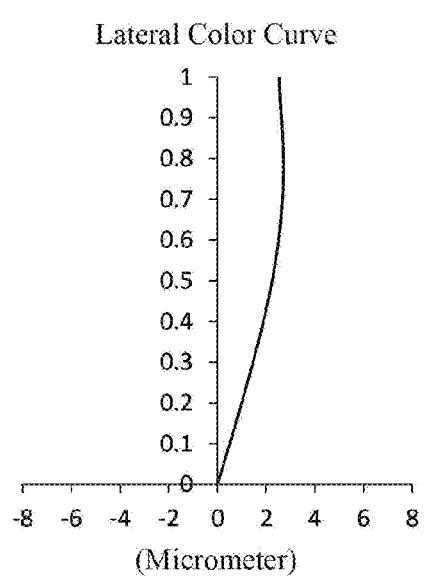

FIG. 8A illustrates a longitudinal aberration curve of the optical imaging lens assembly according to example 4, representing deviations of focal points converged by light of different wavelengths after passing through the system. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different field-of-views. FIG. 8D illustrates a lateral color curve of the optical imaging lens assembly according to example 4, representing deviations of different image heights on an imaging plane after light passes through the system. It can be seen from FIG. 8A to FIG. 8D that the optical imaging lens assembly provided in example 4 may achieve good image quality.

Example 5

Figure 9:
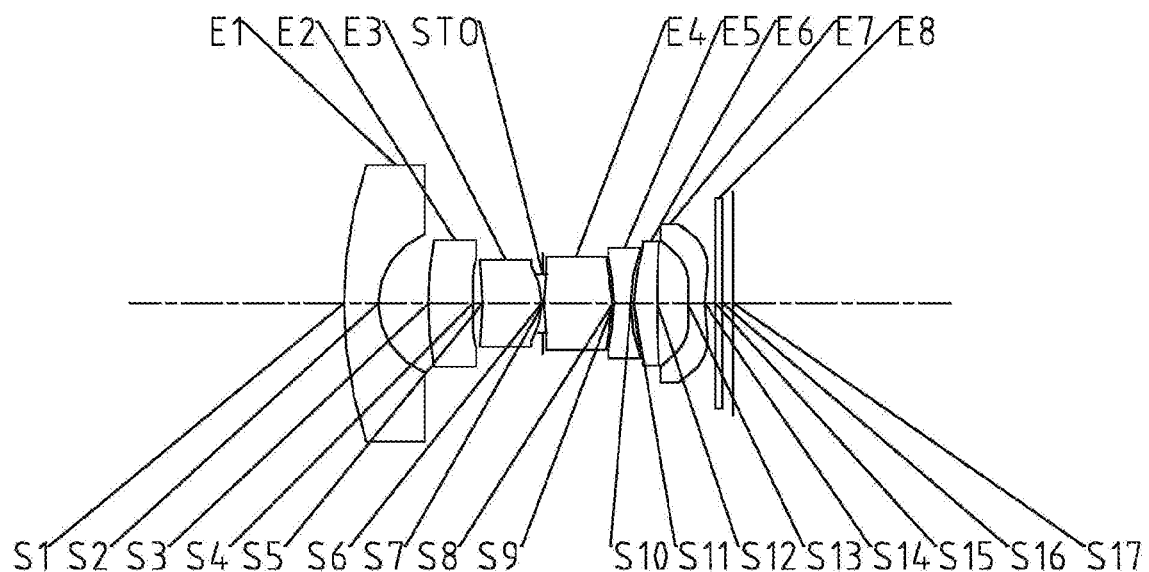
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a first lens E1, a second lens E2, a third lens E3, a stop STO, a fourth lens E4, a fifth lens E5, a sixth lens E6, a seventh lens E7 and an optical filter E8, which are sequentially arranged from an object side to an image side along an optical axis. The first lens E1 and the fourth lens E4 are made of glass material.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has positive refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

In example 5, a total effective focal length f of the optical imaging lens assembly is 2.14 mm, an aperture number Fno of the optical imaging lens assembly is 2.40, an on-axis distance TTL from the object-side surface S1 of the first lens E1 to the imaging plane S17 is 11.40 mm, half of a diagonal length ImgH of an effective pixel area on the imaging plane S17 is 3.00 mm, and half of a maximal field-of-view Semi-FOV is 77.60°.

Table 9 is a table illustrating basic parameters of the optical imaging lens assembly of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 12.8194 | 1.0000 | 1.78 | 49.61 | −3.55 | 0.0000 |
| S2 | Aspheric | 2.1919 | 1.4785 | | | | 0.0000 |
| S3 | Aspheric | 26.2850 | 1.3000 | 1.67 | 20.37 | 12.18 | 17.9043 |
| S4 | Aspheric | −11.5564 | 0.2791 | | | | −45.7131 |
| S5 | Aspheric | −8.4738 | 1.7333 | 1.55 | 56.11 | 4.69 | −25.3415 |
| S6 | Aspheric | −2.1087 | 0.0300 | | | | −0.4395 |
| STO | Spherical | Infinite | 0.0300 | | | | |
| S7 | Aspheric | 6.1365 | 2.0205 | 1.76 | 52.33 | 3.89 | 0.0000 |
| S8 | Aspheric | −4.8646 | 0.0300 | | | | 0.0000 |
| S9 | Aspheric | −3.8048 | 0.5000 | 1.67 | 20.37 | −3.50 | −23.4196 |
| S10 | Aspheric | 6.3870 | 0.0839 | | | | −3.6797 |
| S11 | Aspheric | 3.2879 | 0.6877 | 1.55 | 56.11 | 7.81 | −7.1228 |
| S12 | Aspheric | 13.2663 | 0.8971 | | | | 4.4515 |
| S13 | Aspheric | 10.0433 | 0.5000 | 1.55 | 56.11 | −20.62 | 27.1663 |
| S14 | Aspheric | 5.1766 | 0.3065 | | | | −3.1277 |
| S15 | Spherical | Infinite | 0.2100 | 1.53 | 55.77 | | |
| S16 | Spherical | Infinite | 0.3126 | | | | |
| S17 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S2 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |

TABLE 10-continued

| Surface number | A4 | A6 | A8 | A10 | A12 | A14 | A16 | A18 | A20 |
|---|---|---|---|---|---|---|---|---|---|
| S3 | 1.6324E−02 | −5.7902E−03 | 2.9506E−03 | −1.4449E−03 | 4.5295E−04 | −8.1463E−05 | 6.2071E−06 | 0.0000E+00 | 0.0000E+00 |
| S4 | 6.1771E−02 | −2.9788E−02 | 3.9813E−02 | −4.6294E−02 | 3.7996E−02 | −1.6504E−02 | 2.9720E−03 | 0.0000E+00 | 0.0000E+00 |
| S5 | 3.1090E−02 | −2.3458E−02 | −1.8045E−02 | 5.4094E−02 | −4.9601E−02 | 2.0867E−02 | −3.4798E−03 | 0.0000E+00 | 0.0000E+00 |
| S6 | 3.2283E−03 | −7.4923E−03 | 3.9417E−03 | 3.7418E−04 | −3.5406E−03 | 2.3105E−03 | −4.7177E−04 | 0.0000E+00 | 0.0000E+00 |
| S7 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S9 | 4.0675E−02 | −7.6121E−02 | 1.0345E−01 | −9.8284E−02 | 5.6092E−02 | −1.7191E−02 | 2.1331E−03 | 0.0000E+00 | 0.0000E+00 |
| S10 | 8.1032E−02 | −1.0332E−01 | 1.0015E−01 | −6.4718E−02 | 2.5348E−02 | −5.4170E−03 | 4.7367E−04 | 0.0000E+00 | 0.0000E+00 |
| S11 | −1.5640E−02 | −4.2164E−03 | 2.2308E−02 | −1.8994E−02 | 8.4131E−03 | −2.0678E−03 | 2.1097E−04 | 0.0000E+00 | 0.0000E+00 |
| S12 | −4.8204E−02 | 1.5088E−02 | 1.0468E−02 | −1.1887E−02 | 5.8522E−03 | −1.4783E−03 | 1.4643E−04 | 0.0000E+00 | 0.0000E+00 |
| S13 | −5.7921E−02 | −7.3242E−02 | 1.4825E−02 | 2.3688E−02 | −1.6383E−02 | 4.2248E−03 | −3.9999E−04 | 0.0000E+00 | 0.0000E+00 |
| S14 | 4.7323E−02 | −1.1150E−01 | 6.0008E−02 | −1.8130E−02 | 3.1977E−03 | −3.0879E−04 | 1.2737E−05 | 0.0000E+00 | 0.0000E+00 |

Figure 10A:
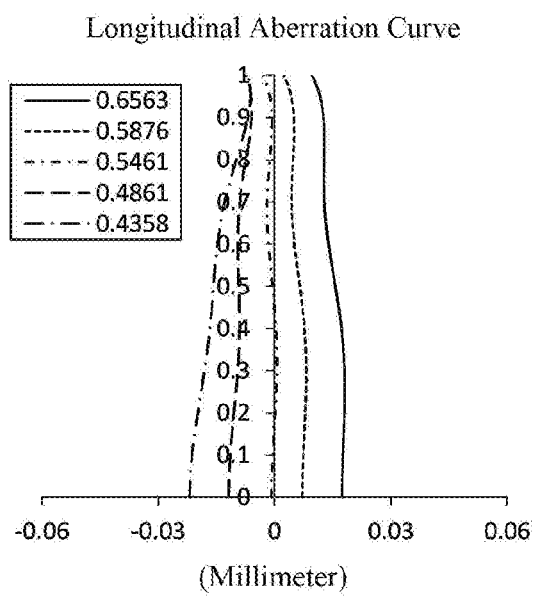
FIGS. 10A to 10D illustrate a longitudinal aberration curve, an astigmatic curve, a distortion curve, and a lateral color curve of the optical imaging lens assembly of the example 5, respectively.
Figure 10B:
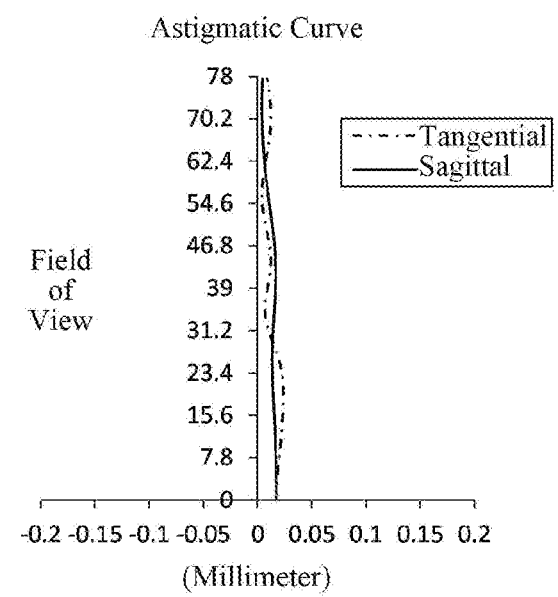
Figure 10C:
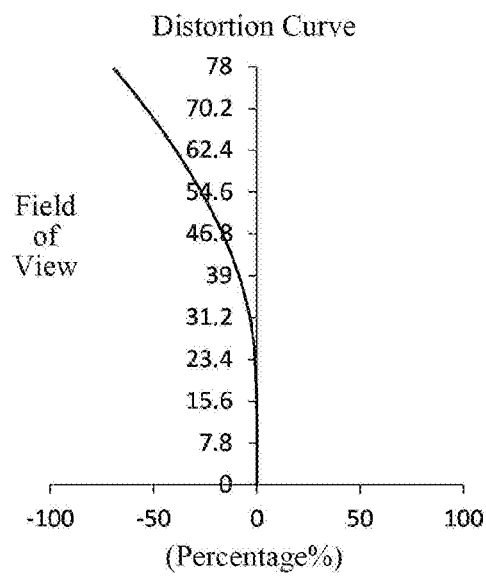
Figure 10D:
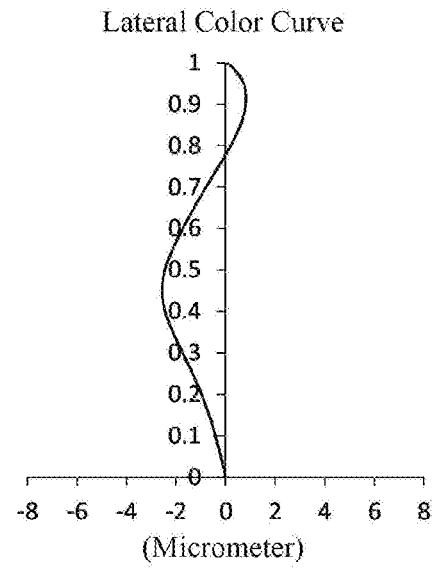

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different field-of-views. FIG. 10D illustrates a lateral color curve of the optical imaging lens assembly according to example 5, representing deviations of different image heights on an imaging plane after light passes through the lens assembly. It can be seen from FIG. 10A to FIG. 10D that the optical imaging lens assembly provided in example 5 may achieve good image quality.

Example 6

Figure 11:
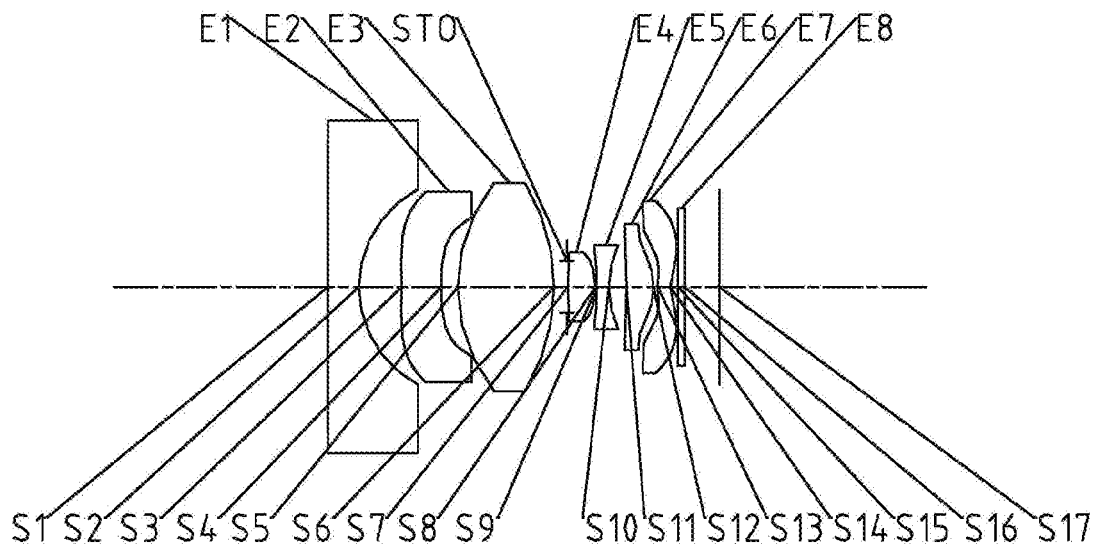
FIG. 11 illustrates a schematic structural view of an optical imaging lens assembly according to example 6 of the present disclosure.

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a first lens E1, a second lens E2, a third lens E3, a stop STO, a fourth lens E4, a fifth lens E5, a sixth lens E6, a seventh lens E7 and an optical filter E8, which are sequentially arranged from an object side to an image side along an optical axis. The first lens E1 and the third lens E3 are made of glass material.

The first lens E1 has negative refractive power, an object-side surface S1 thereof is a flat surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

In example 6, a total effective focal length f of the optical imaging lens assembly is 2.36 mm, an aperture number Fno of the optical imaging lens assembly is 2.40, an on-axis distance TTL from the object-side surface S1 of the first lens E1 to the imaging plane S17 is 12.00 mm, half of a diagonal length ImgH of an effective pixel area on the imaging plane S17 is 3.00 mm, and half of a maximal field-of-view Semi-FOV is 67.28°.

Table 11 is a table illustrating basic parameters of the optical imaging lens assembly of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | Infinite | 0.9500 | 1.64 | 60.20 | −5.29 | 0.0000 |
| S2 | Aspheric | 3.3979 | 1.3079 | | | | 0.0000 |
| S3 | Aspheric | −14.7955 | 1.2163 | 1.55 | 56.11 | −13.31 | −31.4584 |
| S4 | Aspheric | 14.7133 | 0.5044 | | | | 37.4917 |
| S5 | Aspheric | 5.1469 | 2.9535 | 1.81 | 46.59 | 3.93 | 0.0000 |
| S6 | Aspheric | −6.1642 | 0.3915 | | | | 0.0000 |
| STO | Spherical | Infinite | 0.0300 | | | | |
| S7 | Aspheric | 5.9830 | 0.8455 | 1.55 | 56.11 | 3.10 | −4.3107 |
| S8 | Aspheric | −2.2498 | 0.0350 | | | | −1.9398 |
| S9 | Aspheric | −65.7978 | 0.3700 | 1.67 | 20.37 | −4.04 | 99.9900 |
| S10 | Aspheric | 2.8209 | 0.5445 | | | | −7.0581 |

TABLE 11-continued

| Surface number | Surface type | Radius of curvature | Thickness/ Distance | Material Refractive index | Material Abbe number | Focal length | Conic coefficient |
|---|---|---|---|---|---|---|---|
| S11 | Aspheric | −68.7555 | 0.8300 | 1.55 | 56.11 | 4.09 | −57.3824 |
| S12 | Aspheric | −2.1737 | 0.1359 | | | | −5.6645 |
| S13 | Aspheric | 3.0029 | 0.3779 | 1.55 | 56.11 | −3.98 | −38.1675 |
| S14 | Aspheric | 1.1932 | 0.2316 | | | | −4.2324 |
| S15 | Spherical | Infinite | 0.2100 | 1.53 | 55.77 | | |
| S16 | Spherical | Infinite | 1.0673 | | | | |
| S17 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S2 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S3 | 2.3646E−02 | −4.3779E−03 | 1.0025E−03 | −1.6326E−04 | 1.8522E−05 | −1.2460E−06 | 3.5064E−08 | 0.0000E+00 | 0.0000E+00 |
| S4 | 3.3998E−02 | −4.8003E−03 | 2.7339E−03 | −1.0697E−03 | 3.3975E−04 | −5.7373E−05 | 3.4741E−06 | 0.0000E+00 | 0.0000E+00 |
| S5 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S7 | −2.0887E−02 | −1.2809E−01 | 5.8057E−01 | −1.8105E+00 | 3.0302E+00 | −2.6713E+00 | 9.4607E−01 | 0.0000E+00 | 0.0000E+00 |
| S8 | −7.9458E−02 | 8.3445E−02 | −2.1549E−01 | 2.6219E−01 | −2.1697E−01 | 1.0507E−01 | −2.4830E−02 | 0.0000E+00 | 0.0000E+00 |
| S9 | −6.7415E−02 | 1.3182E−01 | −2.5531E−01 | 2.9391E−01 | −2.0579E−01 | 8.1274E−02 | −1.3587E−02 | 0.0000E+00 | 0.0000E+00 |
| S10 | 1.2438E−02 | 2.9412E−02 | −4.4057E−02 | 3.3828E−02 | −1.4741E−02 | 3.3230E−03 | −2.8092E−04 | 0.0000E+00 | 0.0000E+00 |
| S11 | 1.8090E−02 | −4.8689E−02 | 5.3520E−02 | −3.1540E−02 | 1.0681E−02 | −1.9226E−03 | 1.1981E−04 | 0.0000E+00 | 0.0000E+00 |
| S12 | −6.1669E−02 | 1.5629E−02 | −2.2107E−02 | 3.0731E−02 | −1.3640E−02 | 2.5241E−03 | −1.7116E−04 | 0.0000E+00 | 0.0000E+00 |
| S13 | −2.0421E−01 | −1.5988E−02 | 6.7432E−02 | −2.7104E−02 | 4.9756E−03 | −4.5125E−04 | 1.6412E−05 | 0.0000E+00 | 0.0000E+00 |
| S14 | −1.6656E−01 | 8.1705E−02 | −2.8464E−02 | 6.6871E−03 | −9.8937E−04 | 8.1868E−05 | −2.8667E−06 | 0.0000E+00 | 0.0000E+00 |

Figure 12A:
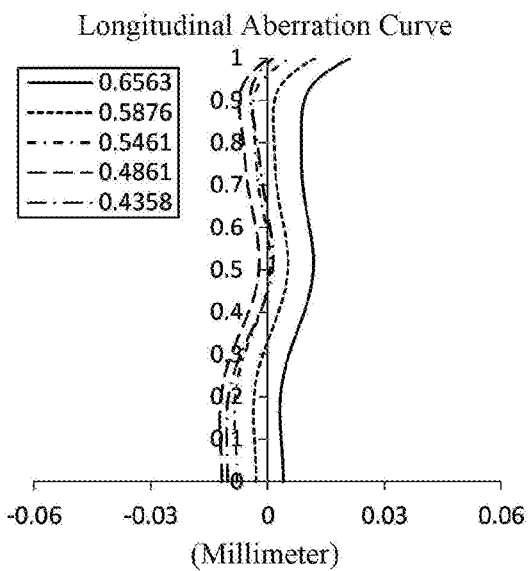
FIGS. 12A to 12D illustrate a longitudinal aberration curve, an astigmatic curve, a distortion curve, and a lateral color curve of the optical imaging lens assembly of the example 6, respectively.
Figure 12B:
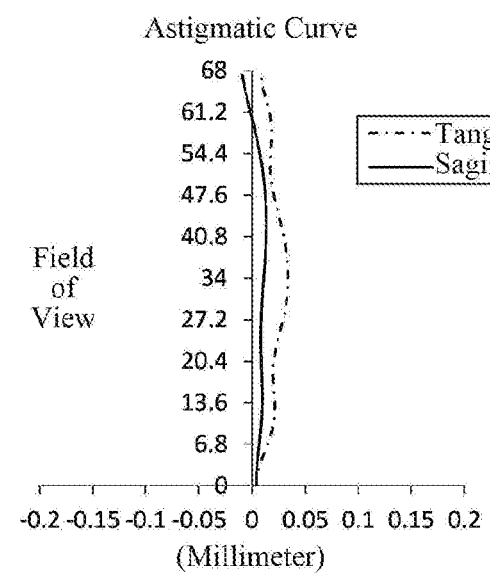
Figure 12C:
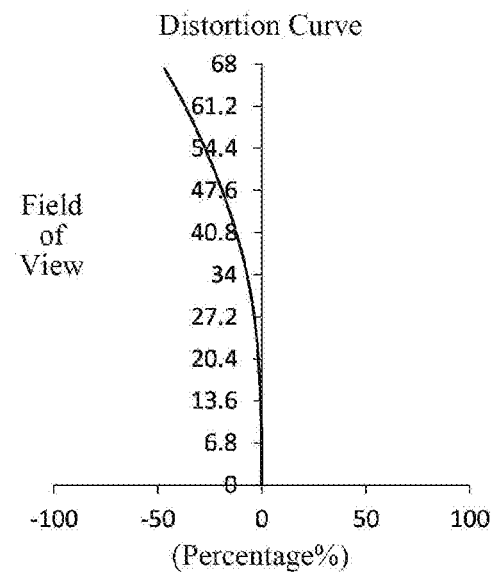
Figure 12D:
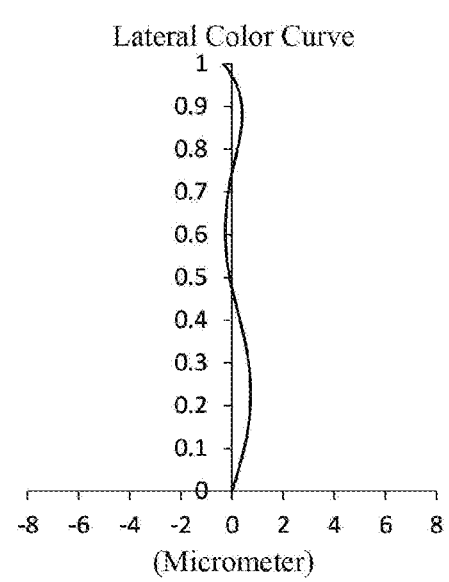

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different field-of-views. FIG. 12D illustrates a lateral color curve of the optical imaging lens assembly according to example 6, representing deviations of different image heights on an imaging plane after light passes through the lens assembly. It can be seen from FIG. 12A to FIG. 12D that the optical imaging lens assembly provided in example 6 may achieve good image quality.

Example 7

Figure 13:
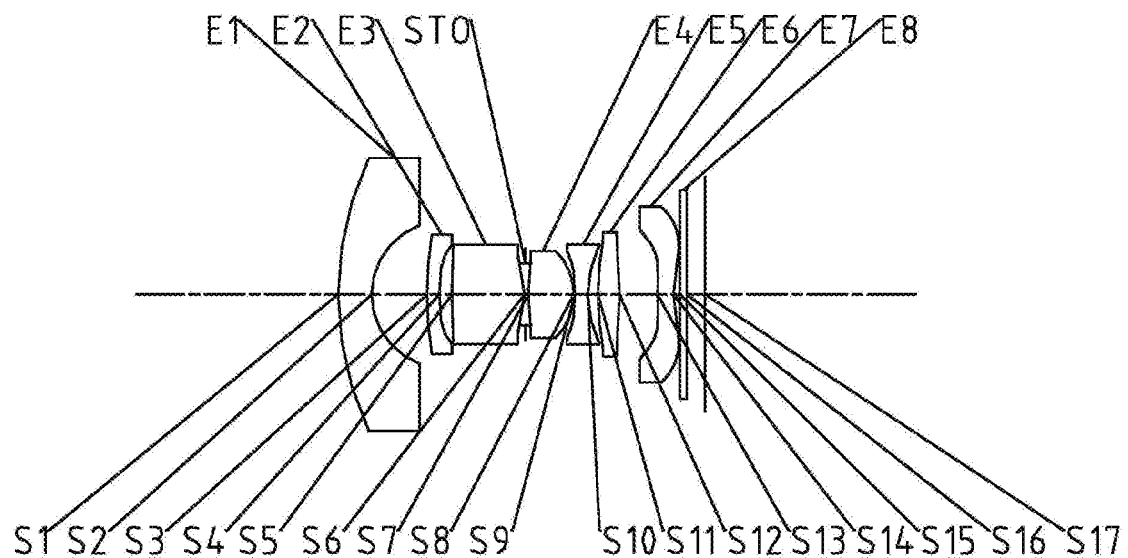
FIG. 13 illustrates a schematic structural view of an optical imaging lens assembly according to example 7 of the present disclosure.

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly includes a first lens E1, a second lens E2, a third lens E3, a stop STO, a fourth lens E4, a fifth lens E5, a sixth lens E6, a seventh lens E7 and an optical filter E8, which are sequentially arranged from an object side to an image side along an optical axis. The first lens E1 and the third lens E3 are made of glass material.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

In example 7, a total effective focal length f of the optical imaging lens assembly is 2.37 mm, an aperture number Fno of the optical imaging lens assembly is 2.40, an on-axis distance TTL from the object-side surface S1 of the first lens E1 to the imaging plane S17 is 10.96 mm, half of a diagonal length ImgH of an effective pixel area on the imaging plane S17 is 3.00 mm, and half of a maximal field-of-view Semi-FOV is 67.60°.

Table 13 is a table illustrating basic parameters of the optical imaging lens assembly of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 9.6411 | 1.0000 | 1.77 | 49.60 | −3.98 | 0.0000 |
| S2 | Aspheric | 2.2335 | 1.6565 | | | | 0.0000 |
| S3 | Aspheric | 19.1567 | 0.3700 | 1.54 | 56.10 | −37.76 | −3.8160 |
| S4 | Aspheric | 9.8609 | 0.3703 | | | | 15.2006 |
| S5 | Aspheric | 28.4417 | 2.1697 | 1.80 | 46.60 | 3.99 | 0.0000 |
| S6 | Aspheric | −3.5124 | 0.0300 | | | | 0.0000 |
| STO | Spherical | Infinite | 0.0851 | | | | |
| S7 | Aspheric | 5.4977 | 1.3555 | 1.54 | 56.10 | 2.74 | 9.9422 |
| S8 | Aspheric | −1.8793 | 0.0350 | | | | −4.9912 |
| S9 | Aspheric | −8.1510 | 0.3842 | 1.66 | 20.40 | −3.01 | −75.3275 |
| S10 | Aspheric | 2.7122 | 0.3052 | | | | −8.8842 |
| S11 | Aspheric | 6.9782 | 0.6408 | 1.54 | 56.10 | 11.30 | −0.2246 |
| S12 | Aspheric | −51.5951 | 1.1361 | | | | 99.9900 |
| S13 | Aspheric | 5.8745 | 0.4856 | 1.54 | 55.70 | −9.60 | −94.2261 |
| S14 | Aspheric | 2.6651 | 0.1827 | | | | −4.5822 |
| S15 | Spherical | Infinite | 0.2100 | 1.52 | 64.20 | | |
| S16 | Spherical | Infinite | 0.5422 | | | | |
| S17 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S2 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S3 | 1.7099E−02 | −1.2596E−03 | 6.7157E−04 | −1.7083E−03 | 7.3207E−04 | −1.3196E−04 | 8.9166E−06 | 0.0000E+00 | 0.0000E+00 |
| S4 | 4.2552E−02 | −1.5587E−03 | 9.5554E−03 | −9.7902E−03 | 5.1169E−03 | −1.2551E−03 | 1.0047E−04 | 0.0000E+00 | 0.0000E+00 |
| S5 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 | 0.0000E+00 | 0.0000E+00 | 0.0000E+00 | 0.0000E+00 |
| S7 | −1.3347E−02 | −3.0059E−02 | 8.9005E−02 | −1.9948E−01 | 2.3261E−01 | −1.4486E−01 | 3.6013E−02 | 0.0000E+00 | 0.0000E+00 |
| S8 | −9.2811E−02 | 5.4039E−02 | −4.1365E−02 | 3.0106E−03 | 1.4794E−02 | −9.3306E−03 | 1.6875E−03 | 0.0000E+00 | 0.0000E+00 |
| S9 | −8.1982E−02 | 6.2652E−02 | −6.2777E−02 | 2.6428E−02 | 7.4994E−04 | −3.6577E−03 | 7.9317E−04 | 0.0000E+00 | 0.0000E+00 |
| S10 | 9.8480E−04 | 2.9690E−02 | −3.5001E−02 | 2.1789E−02 | −8.0323E−03 | 1.7231E−03 | −1.6560E−04 | 0.0000E+00 | 0.0000E+00 |
| S11 | −4.3945E−02 | 4.2248E−02 | −3.5018E−02 | 2.5457E−02 | −1.1390E−02 | 2.7142E−03 | −2.7346E−04 | 0.0000E+00 | 0.0000E+00 |
| S12 | −4.6774E−02 | 1.9127E−02 | −3.3715E−03 | −2.4504E−03 | 2.7600E−03 | −8.3285E−04 | 7.8995E−05 | 0.0000E+00 | 0.0000E+00 |
| S13 | −4.9648E−02 | −2.9445E−02 | 2.6524E−02 | −1.0861E−02 | 2.4328E−03 | −2.7250E−04 | 1.1903E−05 | 0.0000E+00 | 0.0000E+00 |
| S14 | −5.7330E−02 | 1.0520E−02 | −2.1880E−04 | −4.493 8E−04 | 1.0018E−04 | −9.2552E−06 | 3.3049E−07 | 0.0000E+00 | 0.0000E+00 |

Figure 14A:
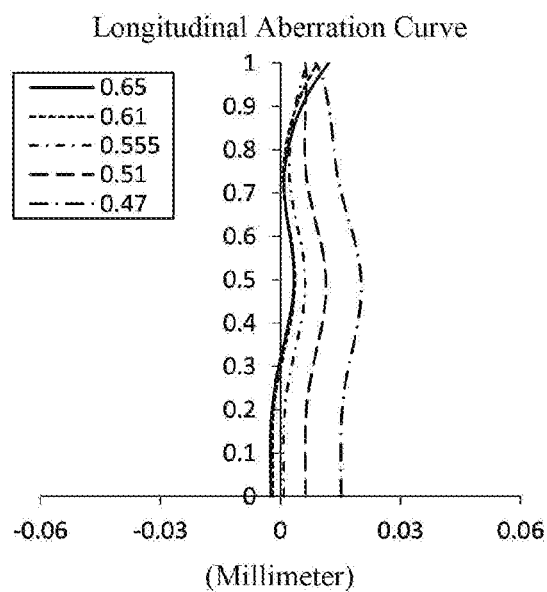
FIGS. 14A to 14D illustrate a longitudinal aberration curve, an astigmatic curve, a distortion curve, and a lateral color curve of the optical imaging lens assembly of the example 7, respectively.
Figure 14B:
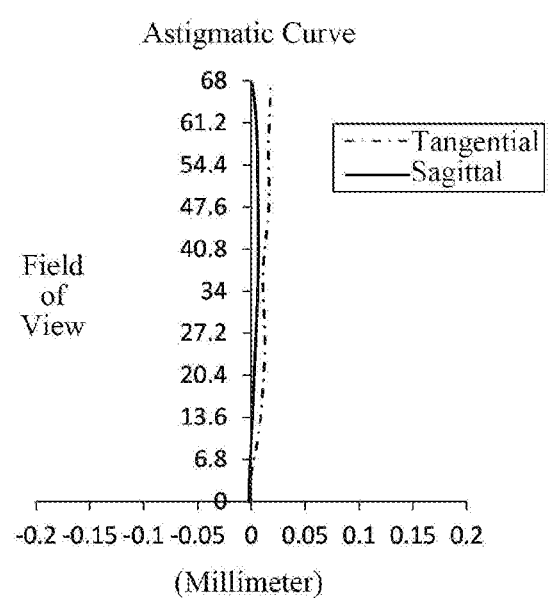
Figure 14C:
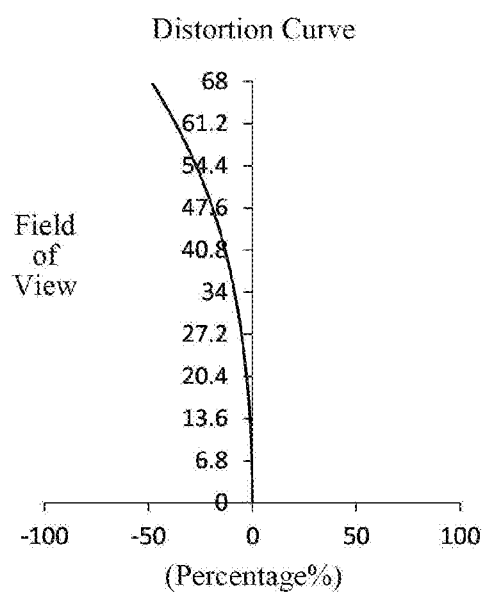
Figure 14D:
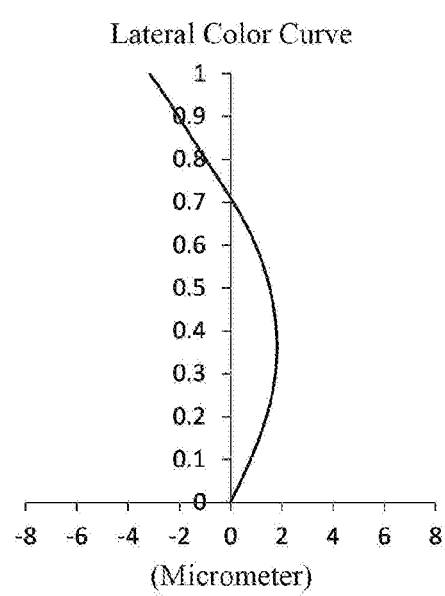

FIG. 14A illustrates a longitudinal aberration curve of the optical imaging lens assembly according to example 7, representing deviations of focal points converged by light of different wavelengths after passing through the lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion corresponding to different field-of-views. FIG. 14D illustrates a lateral color curve of the optical imaging lens assembly according to example 7, representing deviations of different image heights on an imaging plane after light passes through the lens assembly. It can be seen from FIG. 14A to FIG. 14D that the optical imaging lens assembly provided in example 7 may achieve good image quality.

In view of the above, examples 1 to 7 respectively satisfy the relationship shown in Table 15.

TABLE 15

| Conditional/Example | 1 | 2 | 3 | 4 | 5 | 6 | 7 |
|---|---|---|---|---|---|---|---|
| ImgH * EPD | 2.78 | 2.62 | 2.74 | 3.02 | 2.67 | 2.94 | 2.96 |
| DT62/DT72 | 0.63 | 0.72 | 0.54 | 0.72 | 0.78 | 0.73 | 0.71 |
| ImgH/tan(FOV/4) | 3.90 | 3.43 | 3.63 | 3.55 | 3.73 | 4.51 | 4.48 |
| N1+N3+N4 | 5.09 | 5.15 | 5.14 | 5.09 | 5.09 | 5.00 | 5.11 |
| (V1+V3+V4)/3 | 50.39 | 41.60 | 44.33 | 52.68 | 52.68 | 54.30 | 50.77 |
| f/f3 | 0.58 | 0.90 | 0.42 | 0.48 | 0.46 | 0.60 | 0.59 |
| R14/R13 | 0.17 | 1.06 | 1.34 | 0.63 | 0.52 | 0.40 | 0.45 |
| CT3/f | 1.06 | 0.85 | 0.62 | 0.69 | 0.81 | 1.25 | 0.92 |
| ET3/CT3 | 0.89 | 0.71 | 0.88 | 0.74 | 0.87 | 0.32 | 0.90 |
| SAG72/SAG71 | 0.64 | 0.48 | 0.51 | 1.11 | 0.95 | 0.95 | 0.69 |
| T67/T12 | 0.63 | 0.52 | 1.15 | 0.49 | 0.61 | 0.10 | 0.69 |
| (CT2 + CT3 + CT4)/TTL | 0.37 | 0.35 | 0.33 | 0.46 | 0.44 | 0.42 | 0.36 |

The present disclosure further provides an imaging apparatus, which is provided with an electronic photosensitive element for imaging. The electronic photosensitive element may be a photosensitive Charge-Coupled Device (CCD) or a Complementary Metal-Oxide Semiconductor (CMOS). The imaging apparatus may be an independent imaging device such as a digital camera and a camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising a first lens, a second lens, a third lens, a fourth lens, a fifth lens, a sixth lens and a seventh lens, which are sequentially arranged from an object side to an image side of the optical imaging lens assembly along an optical axis,
   wherein,
   at least one of the first lens to the seventh lens is a glass lens;
   the third lens has positive refractive power, and an image-side surface of the third lens is a convex surface; and
   an object-side surface of the seventh lens is a convex surface, and an image-side surface of the seventh lens is a concave surface,
   wherein FOV≥134.56°,
   0.54≤DT62/DT72, and
   ImgH*EPD>2 mm$^2$,
   where FOV is a maximum field-of-view of the optical imaging lens assembly, DT62 is an effective half-aperture of an image-side surface of the sixth lens, DT72 is an effective half-aperture of the image-side surface of the seventh lens, ImgH is half of a diagonal length of an effective pixel area on an imaging plane of the optical imaging lens assembly, and EPD is an entrance pupil diameter of the optical imaging lens assembly.

2. The optical imaging lens assembly according to claim 1, wherein ImgH/tan(FOV/4)<4.7 mm,
   where ImgH is half of the diagonal length of the effective pixel area on the imaging plane of the optical imaging lens assembly, and FOV is the maximum field-of-view of the optical imaging lens assembly.

3. The optical imaging lens assembly according to claim 1, wherein 0<ET3/CT3≤0.9,
   where CT3 is a center thickness of the third lens along the optical axis, and ET3 is an edge thickness of the third lens.

4. The optical imaging lens assembly according to claim 1, wherein 0<f/f3<1,
   where f is a total effective focal length of the optical imaging lens assembly, and f3 is an effective focal length of the third lens.

5. The optical imaging lens assembly according to claim 1, wherein 0<SAG72/SAG71≤1.11,
   where SAG71 is an on-axis distance from an intersection of the object-side surface of the seventh lens and the optical axis to a vertex of an effective radius of the object-side surface of the seventh lens, and SAG72 is an on-axis distance from an intersection of the image-side surface of the seventh lens and the optical axis to a vertex of an effective radius of the image-side surface of the seventh lens.

6. The optical imaging lens assembly according to claim 1, wherein 0.4<CT3/f<1.4,
   where CT3 is a center thickness of the third lens along the optical axis, and f is a total effective focal length of the optical imaging lens assembly.

7. The optical imaging lens assembly according to claim 1, wherein 0<(CT2+CT3+CT4)/TTL<0.6,
   where CT2 is a center thickness of the second lens along the optical axis, CT3 is a center thickness of the third lens along the optical axis, CT4 is a center thickness of the fourth lens along the optical axis, and TTL is an on-axis distance from an object-side surface of the first lens to the imaging plane.

8. The optical imaging lens assembly according to claim 1, wherein 5≤N1+N3+N4<5.5,
   where N1 is a refractive index of the first lens, N3 is a refractive index of the third lens, and N4 is a refractive index of the fourth lens.

9. The optical imaging lens assembly according to claim 1, wherein 0<R14/R13≤1.34,
   where R13 is a radius of curvature of the object-side surface of the seventh lens, and R14 is a radius of curvature of the image-side surface of the seventh lens.

10. The optical imaging lens assembly according to claim 1, wherein 40<(V1+V3+V4)/3<55,
    where V1 is an Abbe number of the first lens, V3 is an Abbe number of the third lens, and V4 is an Abbe number of the fourth lens.

11. The optical imaging lens assembly according to claim 1, wherein 0<T67/T12<1.3,
    where T12 is a spaced interval between the first lens and the second lens along the optical axis, and T67 is a spaced interval between the sixth lens and the seventh lens along the optical axis.

12. An optical imaging lens assembly, comprising a first lens, a second lens, a third lens, a fourth lens, a fifth lens, a sixth lens and a seventh lens, which are sequentially arranged from an object side to an image side of the optical imaging lens assembly along an optical axis,
    wherein,
    at least one of the first lens to the seventh lens is a glass lens;
    the third lens has positive refractive power, and an image-side surface of the third lens is a convex surface; and
    an object-side surface of the seventh lens is a convex surface, and an image-side surface of the seventh lens is a concave surface,
    wherein ImgH/tan(FOV/4)<4.7 mm,
    0.54≤DT62/DT72, and
    ImgH*EPD>2 mm$^2$,
    where ImgH is half of a diagonal length of an effective pixel area on an imaging plane of the optical imaging lens assembly, FOV is a maximum field-of-view of the optical imaging lens assembly, DT62 is an effective half-aperture of an image-side surface of the sixth lens, DT72 is an effective half-aperture of the image-side surface of the seventh lens, and EPD is an entrance pupil diameter of the optical imaging lens assembly.

13. The optical imaging lens assembly according to claim 12, wherein $0<ET3/CT3\leq 0.9$, where CT3 is a center thickness of the third lens along the optical axis, and ET3 is an edge thickness of the third lens.

14. The optical imaging lens assembly according to claim 12, wherein $0<f/f3<1$, where f is a total effective focal length of the optical imaging lens assembly, and f3 is an effective focal length of the third lens.

15. The optical imaging lens assembly according to claim 12, wherein $0<SAG72/SAG71\leq 1.11$, where SAG71 is an on-axis distance from an intersection of the object-side surface of the seventh lens and the optical axis to a vertex of an effective radius of the object-side surface of the seventh lens, and SAG72 is an on-axis distance from an intersection of the image-side surface of the seventh lens and the optical axis to a vertex of an effective radius of the image-side surface of the seventh lens.

16. The optical imaging lens assembly according to claim 12, wherein $0.4<CT3/f<1.4$, where CT3 is a center thickness of the third lens along the optical axis, and f is a total effective focal length of the optical imaging lens assembly.

17. The optical imaging lens assembly according to claim 12, wherein $0<(CT2+CT3+CT4)/TTL<0.6$, where CT2 is a center thickness of the second lens along the optical axis, CT3 is a center thickness of the third lens along the optical axis, CT4 is a center thickness of the fourth lens along the optical axis, and TTL is an on-axis distance from an object-side surface of the first lens to the imaging plane.

18. The optical imaging lens assembly according to claim 12, wherein $5\leq N1+N3+N4<5.5$, and $40<(V1+V3+V4)/3<55$, where N1 is a refractive index of the first lens, N3 is a refractive index of the third lens, N4 is a refractive index of the fourth lens, V1 is an Abbe number of the first lens, V3 is an Abbe number of the third lens, and V4 is an Abbe number of the fourth lens.

19. The optical imaging lens assembly according to claim 12, wherein $0<R14/R13\leq 1.34$, where R13 is a radius of curvature of the object-side surface of the seventh lens, and R14 is a radius of curvature of the image-side surface of the seventh lens.

20. The optical imaging lens assembly according to claim 12, wherein $0<T67/T12<1.3$, where T12 is a spaced interval between the first lens and the second lens along the optical axis, and T67 is a spaced interval between the sixth lens and the seventh lens along the optical axis.

* * * * *